United States Patent
Corcoran et al.

(10) Patent No.: US 9,430,588 B2
(45) Date of Patent: Aug. 30, 2016

(54) ASSEMBLY CONNECTION METHOD FOR ATTACHING VIRTUAL PARTS IN A COMPUTER AIDED DESIGN SOFTWARE ENVIRONMENT

(75) Inventors: David J. Corcoran, Lexington, MA (US); Heung-Wing Li, Chelmsford, MA (US)

(73) Assignee: Autodesk, Inc., San Rafael, CA (US)

( * ) Notice: Subject to any disclaimer, the term of this patent is extended or adjusted under 35 U.S.C. 154(b) by 704 days.

(21) Appl. No.: 12/489,914

(22) Filed: Jun. 23, 2009

(65) Prior Publication Data

US 2010/0010655 A1    Jan. 14, 2010

Related U.S. Application Data

(60) Provisional application No. 61/080,161, filed on Jul. 11, 2008.

(51) Int. Cl.
*G06F 17/50* (2006.01)

(52) U.S. Cl.
CPC ............ *G06F 17/50* (2013.01); *G06F 2217/06* (2013.01)

(58) Field of Classification Search
USPC .................................................. 703/1; 700/98
See application file for complete search history.

(56) References Cited

U.S. PATENT DOCUMENTS

| | | | | |
|---|---|---|---|---|
| 4,927,125 A | * | 5/1990 | Hunter | ............................. 269/74 |
| 6,614,430 B1 | | 9/2003 | Rappoport | |
| 6,844,877 B1 | | 1/2005 | Rajkumar et al. | |
| 7,295,958 B1 | | 11/2007 | Suh et al. | |
| 2002/0107673 A1 | * | 8/2002 | Haller et al. | ....................... 703/1 |
| 2003/0208295 A1 | | 11/2003 | Ishii et al. | |
| 2004/0098151 A1 | | 5/2004 | Carlucci et al. | |
| 2004/0122630 A1 | * | 6/2004 | Fife | .................................... 703/2 |
| 2005/0197822 A1 | | 9/2005 | Onodera et al. | |
| 2006/0094951 A1 | | 5/2006 | Dean et al. | |
| 2007/0124120 A1 | | 5/2007 | Hamazoe | |
| 2010/0060635 A1 | | 3/2010 | Corcoran et al. | |

OTHER PUBLICATIONS

Softimage, Types of Rigid Body Constraints, May 2006, Softimage, pp. 1-3.*
Holland et al., Assembly features in modeling and planning, 2000, Elsevier, pp. 277-294.*
Shah et al., Assembly Modeling as an Extension of Feature-Based Design, 1993, Springer-Verlag London Limited, pp. 218-237.*

(Continued)

*Primary Examiner* — Omar Fernandez Rivas
*Assistant Examiner* — Bernard E Cothran
(74) *Attorney, Agent, or Firm* — Fish & Richardson P.C.

(57) ABSTRACT

A method and apparatus that allows the user of a computer aided design (CAD) system to connect three-dimensional parts to create a three-dimensional assembly using connections that completely define the attachment between the parts attached to each other by that connection. The user can simultaneously define the orientations of the parts and their behavior. "Behavior" includes whether parts are rigidly connected or allowed to move relative to one and other, and if allowed to move, the nature and limits on that movement. Within any movement allowed, the user may specify key discrete orientations known to be important to the function of the assembly, such as orientations that limit movement within the assembly. The connection method creates a smaller, more consistent representation of the underlying constraints of the assembly, improving the reliability, performance, and ease of use of a CAD system in which it is used.

15 Claims, 21 Drawing Sheets

(56) References Cited

OTHER PUBLICATIONS

International Search Report and Written Opinion from corresponding application No. PCT/US2009/049881, mailed Jan. 27, 2010, 11 pages.
International Preliminary Report on Patentability from International Application No. PCT/US2009/049881, mailed Jan. 20, 2011, 6 pgs.
International Preliminary Report on Patentability from International Application No. PCT/US2009/056398, mailed Mar. 24, 2011, 6 pgs.
International Search Report and Written Opinion from corresponding application No. PCT/US2009/056398, mailed Apr. 14, 2010, 11 pages.
Sacks, et al., "Parametric 3D modeling in building construction with examples from precast concrete", Automation in Construction, 2004, vol. 13, pp. 291-312.

* cited by examiner

Fig. 32

| Mates | Connections |
|---|---|
| Coincident1 | Rotating1 |
| Concentric1 | Rotating2 |
| Concentric2 | Rotating3 |
| Coincident3 | Rotating4 |
| Concentric3 | Rigid1 |
| Concentric4 | Rigid2 |
| Coincident4 | Rigid3 |
| Parallel1 | Rigid4 |
| Concentric6 | Rigid5 |
| Coincident5 | Rigid6 |
| Concentric7 | Rigid7 |
| Coincident6 | Rigid8 |
| Parallel2 | Rigid9 |
| Coincident7 | Rigid10 |
| Concentric8 | Rigid11 |
| Coincident8 | Rigid12 |
| Concentric10 | Rigid13 |
| Coincident9 | Rigid14 |
| Concentric11 | Rigid15 |
| Concentric12 | |
| Coincident10 | |
| Concentric13 | |
| Coincident11 | |
| Concentric14 | |
| Coincident12 | |
| Concentric15 | |
| Coincident13 | |
| Concentric16 | |
| Coincident14 | |
| Concentric17 | |
| Concentric18 | |
| Coincident16 | |
| Concentric19 | |
| Coincident17 | |
| Coincident18 | |
| Coincident19 | |
| Concentric20 | |
| Concentric21 | |
| Coincident20 | |

ASSEMBLY CONNECTION METHOD FOR ATTACHING VIRTUAL PARTS IN A COMPUTER AIDED DESIGN SOFTWARE ENVIRONMENT

CROSS-REFERENCE TO RELATED APPLICATIONS

This application claims priority to U.S. Provisional Application Ser. No. 61/080,161, entitled "ASSEMBLY CONNECTION METHOD FOR ATTACHING VIRTUAL PARTS IN A COMPUTER AIDED DESIGN SOFTWARE ENVIRONMENT," filed on 11 Jul. 2008, and incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to the field of three-dimensional computer aided design (CAD) software for use in CAD computer systems.

BACKGROUND

CAD software is used to fully define the shapes, position and movement of real world products. This is distinct from computer aided engineering (CAE) software, which is used to analyze physical characteristics of already defined products, such as strength or mechanism analysis.

The prior art in CAD software provides three major capabilities for an operator of the software, herein referred to as a user. First, it provides the ability to create virtual accurate three-dimensional renderings, or part models, of real world parts. Second, it provides the ability to put these parts together to form virtual three dimension renderings of real world products or sub-products, also called assemblies in a process referred to herein as "assembling". Third, it provides the ability to create documents and technical drawings the parts and assemblies from the virtual part models and virtual assembly models. The first two capabilities, defining the shape of parts and assembling parts, are typically highly iterative and interconnected processes.

As used herein, the terms "parts" and "assemblies" will be used to represent the virtual parts and virtual assemblies as they exist within a CAD computer system (also referred to herein as simply a "CAD computer"). CAD computers, generally, are well-known in the art and typically (although not exclusively) comprise a central processing unit (CPU), one or more graphics processors, a display device, one or more data storage devices (i.e., computer-readable medium or media, generally, such as disk drives, tape drives, RAM, ROM, compact disc ROM, DVD, and the like), a keyboard, a mouse or other pointing device (including but not limited to a pen or tablet system), and other related peripheral devices.

Parts and assemblies that exist in the real world will be referred to as "real world parts" and "real world assemblies."

In addition to parts and assemblies, there also exist subassemblies. For example, a desk assembly could contain a drawer subassembly that contains a set of discrete parts. A subassembly is just an assembly that is contained in another assembly. Any assembly with multiple parts could be divided arbitrarily into different subassemblies or could be considered a one level assembly consisting only of discrete parts and no subassemblies. For the purposes of this application, it is sufficient and more straightforward to present the invention and the prior art using a one-level assembly only. However, the invention is equally applicable to multi-level assemblies.

The prior art of assembling is reduced to practice in several commercial CAD software products, including the Pro/ENGINEER® design software of Parametric Technology Corporation, the SOLIDWORKS® design software of SolidWorks Corporation, and the Autodesk Inventor® design software of Autodesk, Inc. Assembling is referred to by different names in different products, such as "assembly mating" or "assembly constraining". In this document, it will simply be referred to as "assembling". The prior art has been commercially available in mechanical CAD products in relatively the same form for approximately 20 years and has been used to successfully assemble assemblies ranging from two parts to tens of thousands of parts.

The primary method of assembling used in the prior art is as follows. The user creates geometric relationships between geometric entities existing in the parts to be assembled. For example, as shown in FIG. 1, the user could apply a coincident constraint between a planar face 100 on the first part 101 and a planar face 110 on the second part 111. This would result in one or both of the parts 101 and 111 moving in 3D space so that their respective planes 100 and 110 were coincident (FIG. 2). The above-described geometric relationship in the prior art is referred to herein as a "mate" and the process of using mates to do assembling in the prior art as "mating."

Mating is the method by which the user applies mates to multiple parts in an assembly to move them into the correct orientations. The mates are processed by the software to define a system of constraints. These constraints are solved together to determine valid orientations of the parts. The parts are then moved by the software into those orientations. Solving the constraints is referred to as "constraint solving" and the software component used to perform the constraint solving is referred to as a "constraint solver". The D-Cubed™ 3D Dimensional Constraint Manager (3D DCM) of Siemens Product Lifecycle Management Software is an example of such a constraint solver.

For the purposes of this application, the constraint solver can be viewed as a "black box". The inputs to the constraint solver are: a set of constraints, a set of simple geometries referenced by the constraints, and a set of rigid bodies. Each rigid body contains a subset of the simple geometries. Each rigid body also has an orientation in 3D space that is typically represented by a transformation matrix. The outputs from the constraint solver are: a set of new orientations of the rigid bodies such that the rigid bodies conform to the input constraints and information about the remaining degrees of freedom of the rigid bodies.

FIG. 3 illustrates is a simple example of mating well known in the art. The user has already rigidly oriented box 300 on top of box 310 by creating three "coincident" mates between three pairs of planar faces on the boxes. The first coincident mate was created between planar face 301 on box 300 and planar face 311 on box 310. The second mate was created between planar face 302 and planar face 312. The third mate was created between planar face 313 and planar face on the underside of box 300 (which is not visible in the FIG. 3). Each coincident mate made its two faces coplanar and thus sharing the same plane in infinite space as shown. The constraints were solved together by the constraint solver and the one box was moved on top of the other as shown. In a similar manner, the two boxes could have been rigidly oriented by creating coincident mates between three aligning pairs of linear edges instead of the three faces. There are many additional combinations of face mates, edge mates, vertex mates, or other types of mates that could create the same rigid orientation between the two boxes.

As additional mates are added to the assembly, the orientations of parts are further defined and the internal degrees of freedom of movement between the parts are eliminated. In a fully rigid assembly in which no parts can move relative to the other parts, all six internal degrees of freedom between each part are eliminated by the mates. In the case where the assembly is designed to allow movement, which is typical in assemblies, fewer mates would be added than in the case of the fully rigid assembly. The remaining degrees of freedom then define the allowable movement of the assembly. Typically, in the prior art, the number of mates that are required to fully define the desired orientation and movement of an assembly is between two and three times the number of parts in the assembly. So, for example, an assembly containing 300 parts would typically contain between 600 and 900 mates.

Consider a similar case (FIG. 4) to that of the two boxes described in FIG. 3, but in which the user wants box 400 to be able to slide away from box 401 in a straight line. This movement is depicted by arrow 402. In this case, also well known in the art, the user would choose to create the first two mates as described in the FIG. 3 example, but would choose not to create the third mate, thus retaining the one degree of freedom as shown by arrow 402.

Another feature of the prior art is that it allows the user to visualize the movement of the assembly by animating the allowed movement. For example, the animation can be produced by interactively dragging a part in the assembly using the computer mouse. The part then moves as closely as possible to the orientation indicated by the moving mouse within the remaining degrees of freedom as defined by the mates and determined by the constraint solver.

Determining if and how one part can move relative to a part to which it is mated requires: converting the set of mates to a system of constraints, then analyzing the system of constraints to remove degrees of freedom from the system as a whole, then deducing the remaining degrees of freedom of the system as a whole, then examining those remaining degrees of freedom relative to the two parts to determine the allowable movement between those two parts. This analysis is typically performed in the prior art by the aforementioned constraint solver software component.

There are two types of mates in the prior art that are employed by the user much more than any other type. The first type is a coincident mate between two planes as described previously. The second type is a coincident mate between two infinite lines. The second type covers the cases of concentric revolved faces such as cylinders where the axes of the cylinders define infinite lines that are made coincident. This type is very common because it is used to align holes in attached parts. This is shown in FIG. 5, where cylindrical face 501 on part 500 is made coaxial with cylindrical face 511 on part 510.

In some cases, the prior art also supports higher order mates which more fully define the nature of the attachment between parts, such as cam-follower mates and hinge mates. For example, a hinge mate is the equivalent of a plane-to-plane coincident mate and a line-to-line mate, defining the kind of position and motion that exists between the two pieces of a hinge. However, in the prior art, the user is allowed to mix and match higher-order and lower-order mates to assemble the parts. In the prior art, the vast majority of mates used are lower order mates and it is not possible to define most realistic assemblies without using lower order mates.

Although the prior art has been used successfully to position parts to form assemblies in CAD software environments, it is desirable to provide a superior method of orienting parts that provides a more efficient and realistic method of assembling parts, thus allowing users to design products faster and more reliably.

SUMMARY

Unfortunately, there are deficiencies to the above-described conventional approaches. These deficiencies arise from the fact that a mate is not a complete representation of an attachment between two parts. In the prior art, the attachment between two parts can often only be fully understood when many additional mates and parts are analyzed. This introduces complexity for the user and performance and reliability implications for the CAD software environment. Similarly, the movement allowed by an attachment between two parts can often only be fully understood when many additional mates and parts are analyzed. In addition, the concept of limited movement is not represented in mates, although it is far more common than unlimited movement in real world assemblies.

In contrast to the above-described conventional approaches, embodiments of the invention always represent the attachment as a single entity. One embodiment of the invention is directed to a new method for the user of a CAD software environment to assemble parts into assemblies and to visualize the movement of assemblies. This new method will be referred to herein as "connecting". In this embodiment, the prior art method of "mating" is entirely replaced by "connecting" and the prior art "mate" relationship is replaced by a "connection" relationship.

A Connection is a single user created relationship between two parts which fully encapsulates how those two parts are attached to one and other, if and how they can move relative to one and other, and the limits on that movement if such limits exist. Connections can be classified into two major subtypes: rigid connections and moving connections. Within moving connections, they can be further classified based on the type of movement, such as, but not limited to, a rotating connection and a sliding connection. Unlike mates in the prior art, there is always a one-to-one relationship between a connection and the attachment it represents, and all aspects of that attachment are represented in the connection. A key aspect of the invention is that all attachment information in the assembly must be specified only using Connections, as described above. Attachment information cannot be defined using a mix of connections and lower-level mates as described with respect to the prior art. By requiring that all attachments be defined by high level connections, embodiments of the invention are much more efficient and powerful than the prior art, as will be described in detail below.

A Position is a single discrete alignment of two parts connected by a moving connection along one of the degrees of freedom that connection allows. For example, a drawer could have an "open" position, a "closed" position, and a "half open" position. The number and meaning of the positions are defined by the user. The positions are useful for defining a limited range of movement within a connection (for example, a door that can only rotate 180 degrees, between the closed position, at 0 degrees relative to the door frame, and the open position, at 180 degrees relative to the door frame). A CAD system may choose to require the user to specify a Preferred Position for certain moving connections.

To illustrate the embodiment, we first assume the user has already defined his or her parts (via "shape definitions") in the CAD system and has placed them in an assembly in an unattached state spaced apart from one and other. The user then attaches the parts (or shapes) to one and other in a piecewise fashion using Connections. The Connections define the nature of the orientation and movement relationship between the two parts. The user specifies whether the Connection will be a rigid Connection or a moving Connection. If the Connection is a moving connection, the user specifies the type of movement (for example, rotating, sliding, both sliding and rotating, etc.). The user creates or selects sufficient information on each part to allow the system to move the parts into the correct orientation relative to one and other. If the connection is a Moving Connection, the user may specify a Preferred Position within the full range of movement, or accept a default Preferred Position as computed by the system. If the user wants the movement to be limited, the user specifies additional Positions within the Connection at the limit points of the movement. These Positions can be used along with the Connections for many downstream purposes, such as but not limited to: defining specific configurations of the assembly, defining additional ranges of movement, defining animations that show the assembly in action, performing clearance analysis, performing collision detection, creating exploded views, creating assembly and disassembly instructions, and improving the ease of preparing the design for downstream analysis, such as finite element analysis and mechanisms analysis. Each of these tasks is made simpler and more efficient by the introductions of Connections and Positions.

The resultant assembly contains approximately one connection per part, as opposed to 2 to 3 mates per part in the prior art. This alone is a major improvement to the complexity of the assembly relationships that the user must manage.

In addition, each connection connects exactly two parts and describes the nature of movement between the two parts, eliminating the need to employ a constraint solver to determine the nature of movement between attached parts. In cases where a constraint solver is still necessary, an embodiment of the invention dramatically reduces the number of inputs required to the constraint solver relative to the prior art and dramatically reduces the frequency with which a constraint solver must be used relative to the prior art. This is a result of prohibiting the use of lower-level mates, as described above. These advantages of an embodiment of the invention make the CAD environment less prone to user error, less prone to computational error, less prone to performance problems, and easier for the user to understand, manage, and correct. A constraint solver software component used in the prior art is sufficient for the requirements of an embodiment of the invention.

In addition to the advantages described above, an embodiment of the invention provides additional user capabilities not present in the prior art. First, a Connection provides a useful mechanism to understand, animate and demonstrate the allowable movement between two connected parts; second, a moving connection provides a context in which the user may define discrete important Positions within the range of movement; and third, the user may then define the limits of the allowable movement between two parts by specifying a start Position and an end Position. This provides the user both a more realistic and more informative emulation of real world assembly movement that did not exist in the prior art.

Accordingly, the invention is capable of allowing the user to assemble his or her CAD designs more quickly, more reliably, and with a better understanding of the assembly and its movement. The practical benefit of the invention is that users will be able to design their products faster and more reliably, thus reducing the time and expense required to bring products to market.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 32 shows a comparison of the mates required in the prior art to the connections required in one embodiment of the present invention, to assemble the scooter assembly.

DETAILED DESCRIPTION

The detailed description is broken into the following subsections. The Description of User Visible Objects subsection defines the objects that are unique to an embodiment of the present invention. The Deficiencies of the Prior Art subsection describes in detail the major deficiencies of the prior art, with an explanation of how those deficiencies are eliminated by an embodiment of the present invention. The Implementation subsection presents examples of specific situations in a CAD software environment. Within each example, the portions of an embodiment of the present invention exercised are presented in detail.

Description of User Visible Objects

Figure 6:
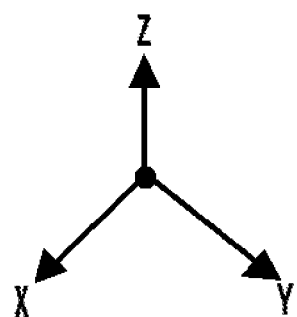
FIG. 6 illustrates a local coordinate system, as known and used in the prior art.

Embodiments of the present invention depend on the use of the following user visible objects:

- A Connection is a single user created relationship between two parts (or shapes) which fully encapsulates how those two parts are attached or connected to one and other, if and how they can move relative to one and other, and the limits on that movement if such limits exist. Connections can be classified into two major subtypes: rigid connections and moving connections. Within moving connections, they can be further classified based on the type of movement, such as, but not limited to, a rotating connection or a sliding connection. Unlike mates in the prior art, there is always a one-to-one relationship between a connection and the attachment it represents, and all aspects of that attachment are represented in the connection. A key aspect of the invention is that all attachment information must be specified only using connections as described above; attachment information cannot be a mix of connections and lower-level mates that do not specify the entire nature of the attachment between components.
- A Position is a single discrete alignment of two parts connected by a moving connection along one of the degrees of freedom that connection allows. For example, a drawer could have an "open" position, a "closed" position, and a "half open" position. The number and meaning of the positions are defined by the user. The positions are useful for defining a limited range of movement within a connection (for example, a door that can only rotate 180 degrees, between the closed position, at 0 degrees relative to the door frame, and the open position, at 180 degrees relative to the door frame).
- A Connection Side represents the specific information on one of the parts that is connected. Thus, each Connection has two Connection Sides, and each Connection Side resides on one of the two parts, which are connected. Specifically the Connection Side is a set of simple geometry that is rigidly defined in terms of the part. By aligning the two connection sides, the parts are aligned. In fact, the connection side as described in this embodiment is exactly the same physical structure as a "local coordinate system" data structure that has existed in most commercial 3D CAD software products for over twenty years, namely that shown in FIG. 6. The prior art supports defining a local coordinate system rigidly in any desired orientation relative to a part and how to do so is well understood to a CAD software developer of ordinary skill in the art. Thus, while the embodiment above describes creating connections based on connection sides that are defined in terms of a circular hole on a planar face, one of ordinary skill in the art will readily appreciate that the present invention can be logically extended to define connections in terms of connection sides themselves defined on a part in any orientation on the part. As such, the examples described can be logically extended to cover connecting any two parts in any desired orientation.

Deficiencies of the Prior Art

The first deficiency is that there is not a one to one correspondence between mates and the real world attachments of parts of an assembly. In the real world, one of ordinary skill in the art would consider certain parts within an assembly to be attached to one and other. For example, one part is rigidly attached to another part in a set of specified places. Or one part is attached to another part in a set of specified places, and it can rotate about an axis shared between both parts. However, within the prior art, the user must create two or three independent mates to represent either of these attachments. Each of the two most commonly used mates described earlier allows the parts they connect to move infinitely far from each other. The mates only express the full nature of an attachment when they are considered in subgroups. In many cases, these subgroups do not just include the two parts that are attached, but can also include a cycle of additional mates and parts, making the real world attachment even more difficult to discern.

This deficiency is overcome in the present invention by the introduction of the Connection entity. There is a one-to-one relationship between the Connection entity and the attachment it represents. In embodiments of the present invention, all attachment information is represented by high-level connections; lower-level mates are not allowed.

The second deficiency is that mates do not encapsulate the nature of the real world attachments between parts of an assembly. The nature of the movement between any two attached parts in an assembly is usually obvious to one of ordinary skill in the art. Most often, they are rigidly attached and cannot move relative to one and other. When they can move, most often they are attached in a way that allows only one degree of freedom, either a simple rotation or a simple linear sliding movement. While the overall assembly may have very complicated movement, the movement between any two attached parts is usually very simple. For example, in a four bar mechanism which is fixed at both ends, there are only rigid and simple rotating attachments. However, the mechanism as a whole can move in a complex manner. A piston assembly provides a similar example. In the prior art, the simple movement information between pairs of parts in the assembly is not known a priori, and must be deduced by analyzing at least some and sometimes all of the mates to identify the degrees of freedom, often requiring the use of a constraint solver. It would be better if an attachment between two parts was known a priori to be rigidly attached or attached in a way that allows movement, and if so, what type of movement it allows.

The second deficiency is overcome in the present invention by the introduction of specific types of connections such as, but not limited to, the Rigid Connection, Rotating Connection, and Sliding Connection. The end user defines the type of Connection he wants to use to connect two parts, and thus it is known a priori from the Connection itself whether the parts attached by the Connection are rigidly attached or attached in a way that allows movement, and if so, what type of movement it allows.

Figure 1:
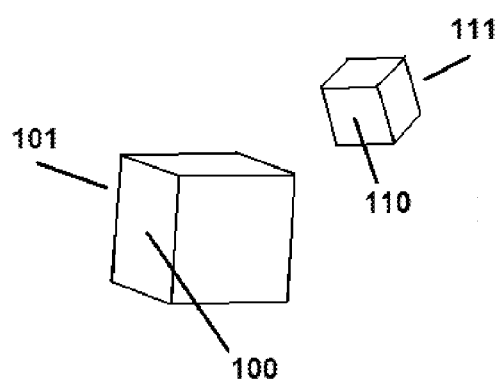
FIG. 1 illustrates the "before" state of an example of creating one mate, as known and used in the prior art.
Figure 2:
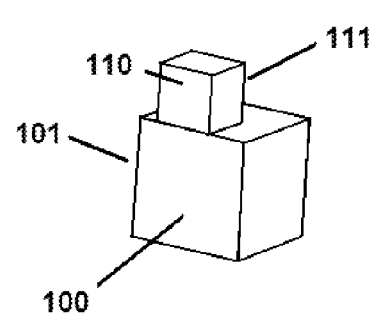
FIG. 2 illustrates the "after" state of an example of creating one mate, as known and used in the prior art.
Figure 3:
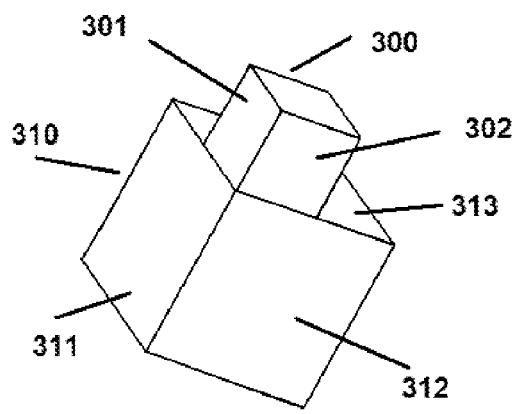
FIG. 3 illustrates the "after" state of an example of creating three mates to rigidly attach two boxes to one and other, as known and used in the prior art.
Figure 4:
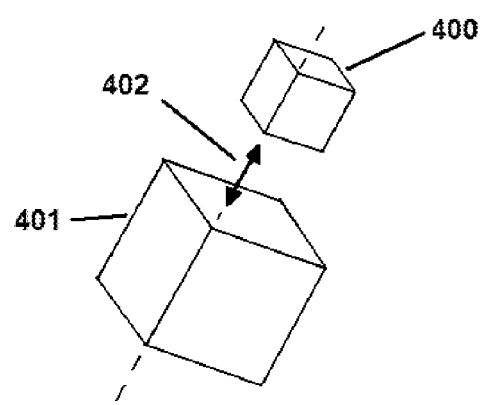
FIG. 4 illustrates the "after" state of an example of creating two mates to attach two boxes to one and other with one sliding degree of freedom, as known and used in the prior art.
Figure 5:
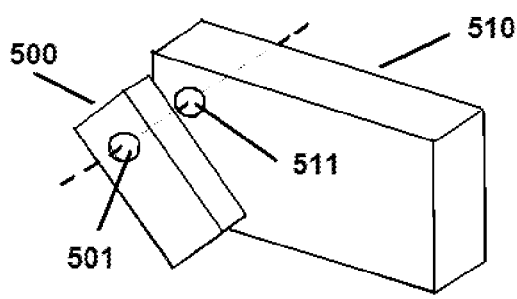
FIG. 5 illustrates the "after" state of an example of a coaxial mate, as known and used in the prior art.
Figure 7:
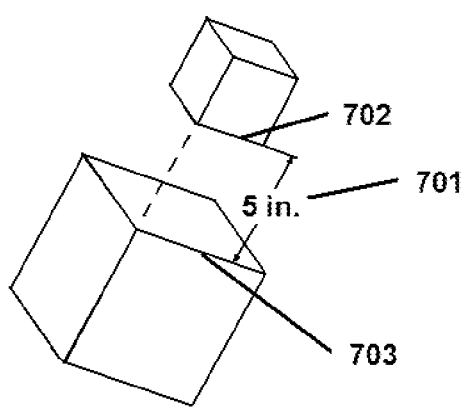
FIG. 7 illustrates the "after" state of an example of using a distance mate to attach two boxes to one and other at a specific position, as known and used in the prior art.

The third deficiency is that, in the case of a moving attachment, there is not a convenient way for the user to define important positions within the allowable range of movement without affecting the allowable range of movement. For example, consider the earlier example shown in FIG. 4, in which the user mated two boxes with sliding movement. Now assume the user wants to define important positions along that sliding movement. Within the prior art, the user could add an additional distance mate 701 between the two edges 702 and 703 as shown in FIG. 7. This would make the boxes fully rigid relative to one and other at that specific distance. He could also specify other values for that distance to define additional important positions. However, once the additional distance mate is applied, the two components are constrained at that distance and no longer free to move. The distance mate must be deleted or disabled (suppressed) to allow movement. This is both inconvenient for the user and is not representative of the real world behavior. It would be desirable for the user to be able to define important positions within the allowable ranges of movement of attached parts within the assembly without having to disable the movement.

The third deficiency is overcome by embodiments of the present invention by allowing the user to define named Positions along each degree of freedom of a moving connection. The Positions can be defined explicitly be a value (such as "at ten inches") or implicitly by a condition to be met (such as where a face on the first part touches a face on the second part).

The fourth deficiency is that mating is not appropriate for representing limited movement. In the example just discussed of two boxes with sliding movement, one box can slide away from the other for infinity. However, this is not representative of the way assemblies usually function in the real world. In the real world, most assembly movement is limited. A method of attaching parts that allowed the user to specify the limits of movement would be functionally superior to mates in the prior art.

The fourth deficiency is overcome by embodiments of the present invention by allowing the user to specify a limited range of movement by defining named Positions at the limits of the movement and using those Positions to define a limited range of movement.

The fifth deficiency is that it is not easy to determine which subsets of parts within the assembly are rigidly attached to one and other and thus move together. A key aspect of real world assemblies is that even in assemblies that move, the majority of parts are connected to other parts rigidly, and thus there are many fewer moving subsets of parts than there are parts. This fact is not represented in the prior art. In the prior art, all the rigid subsets of parts can only be determined by asking the constraint solver to analyze many or all the constraints between many or all of the parts. Thus, within the prior art, there is generally a one to one correspondence between the number of parts and the number of rigid bodies presented to the constraint solver. Consider a simple case of an assembly of a desk with one rigid desk-frame and one rigid drawer. The drawer and desk-frame each consist of 50 rigidly connected parts, so in total there are 100 parts within the assembly. The drawer has tabs that slide along grooves in the desk-frame. There are no moving parts within the drawer or within the desk-frame. In the prior art, the virtual assembly will contain 2 to 3 mates per part, and thus 200 to 300 mates. In the prior art, determining that such a simple assembly has only two moving subsets of parts and one only degree of freedom requires that the constraint solver be presented with one hundred rigid bodies (one for each part), several hundred simple geometries (as defined by the edges and faces referenced by the mates between the parts), and several hundred constraints. In theory, the same movement problem could have been presented to the same constraint solver with two rigid bodies, six geometries, and three constraints. This has serious performance implications, ease of use implications, and reliability implications.

The fifth deficiency is overcome in embodiments of the present invention by first determining all parts that have rigid connections to determine the rigid subsets of parts within the subassembly. (An algorithm to perform this tracing called Assembly.GetRigidSubsetsofParts( ) is described in detail in pseudo-code later in this section). There is no need to call a constraint solver to determine the rigid subsets because the rigid part subsets are defined by the tracing process. Thus, only one rigid body per rigid subset and only those constraints related to the moving connections need to be presented to the constraint solver. This is the case because, in embodiments of the present invention, all attachment information must be specified only using connections as described above. Attachment information cannot be a mix of connections and lower-level mates. This is because lower-level mates do not specify the entire nature of the attachment between components and thus would require the use of a constraint solver to determine the rigid sets of components, thus reintroducing the deficiency.

The sixth deficiency is that the mates that are available to the user often result in a constraint system that has more degrees of freedom than the real world assembly it represents. Consider an assembly where one box is connected to another box with four screws. A person of ordinary skill in the art would easily recognize this as one rigid set of six parts. However, in the prior art, it would typically be the case that the mates the user employs to attach the screws to the boxes would not define the last rotational degree of freedom between each screw and the boxes. As a result, the constraint solver cannot internally recognize that these six parts form a rigid set. In fact, the constraint solver would consider each screw to have an independent rotational degree of freedom. Thus, even after being analyzed, the constraint solver would view this as a system of five rigid subsets with four internal degrees of freedom. It would be able to determine that the two boxes are rigid relative to one and other, but only by analyzing the full system of constraints. While this case is simple, its ramifications are large when you consider that many parts in many assemblies are connected in a rigid fashion by rotationally symmetric fasteners like screws and bolts. This presents a much more complex system to the constraint solver and to the user than is necessary. In the desk example above, imagine that all of the parts are connected by screws. The constraint solver would then produce a system in which there were many remaining degrees of freedom, an extraneous rotating one for each screw and the single desired sliding one for the drawer subset of parts relative to the desk subset of parts. However, to the constraint solver, this is roughly as complex as a case in which there are supposed to be hundreds of meaningful degrees of freedom. When the set of mates defined by the user is incorrect (which is often the case in the iterative process of assembling the parts), the user can be presented with a very complicated situation to debug. This has serious performance implications, ease of use implications, and reliability implications. As an alternative within the prior art, the user could have decided to remove the remaining rotational degrees of freedom by adding one additional mate per screw. This has the advantage that the constraint solver would then be able to fully determine the two rigid subsets and present only one degree of freedom to the user. But it has the disadvantages of requiring more work by the user, requiring the user to enter a mate that is not important to the design itself but is only important to help the constraint solver return the desired result, and in requiring the user to manage more mates. Moreover, it has the disadvantage of making the numbers of constraints and geometries presented to the constraint solver even larger. Thus, this alternative also presents serious performance implications, ease of use implications, and reliability implications. It would be better if it were known a priori that such attachments were rigid.

The sixth deficiency is overcome by embodiments of the present invention because the user would naturally choose to create rigid connections between the screws and the parts to which the screws are attached, as the user is aware that the nature of the attachment is rigid. This is a direct result of the present system not allowing lower-level mates as in the prior art. Creating a rigid connection is described in detail later in this section.

Implementation

A typical computerized CAD system or "CAD computer" is configured to include one or more CPUs, input devices such as a computer mouse and a keyboard, storage devices such as a personal computer, and graphical display devices, such as a computer monitor, one or more CAD programs, and one or more CAD data structures representing the parts and their mates. These CAD programs may be provided in executable program form, source code, object code, microcode, or the like ad on a variety of media useable with the aforementioned hardware components. For example, but not by way of limitation, the CAD program(s), consisting of computer instructions, may be stored in memory, supplied on a computer-readable medium of any type know or used in the broad computer arts, or transmitted via a network. A computer CAD system and its computer instructions or software could be local, like a desktop computer, or distributed, like a web application. The present invention may use any or all of these components; one of ordinary skill in the art will appreciate that ordinary variations in the hardware configuration may be accommodated without departing from the scope of the present invention.

Figure 8:
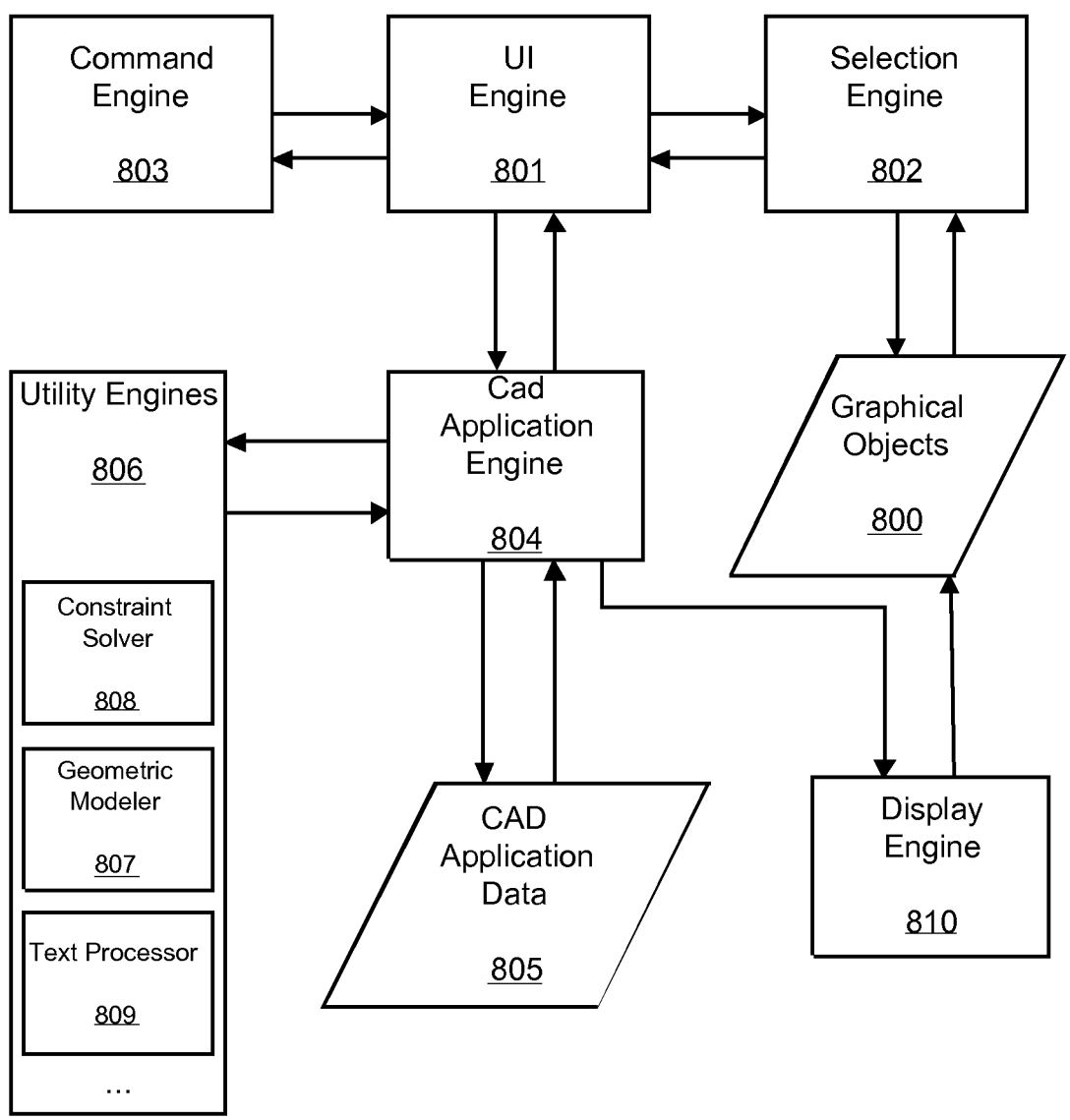
FIG. 8 is a flowchart illustrating the interaction of the major components of a typical CAD program.

FIG. 8 shows the interaction of the major components of a CAD program according to an exemplary embodiment of the present invention. The user drives the system through the user interface (UI) engine 801. The UI engine employs the selection engine 802 to select graphical objects 800 from the CAD data structure(s) to act upon. The UI engine employs the command engine 803 to specify operations for the CAD application engine 804 to perform. The CAD application engine processes the CAD application data 805 to perform these operations, updates the CAD application data structures accordingly, and informs the UI Engine of the results. In the process of performing its work, the CAD application engine may employ Utility engines 806 that perform specific functions. Examples of utility engines commonly used in a typical CAD program include a geometric modeler 807, a constraint solver 808, and a generic text processor 809. The UI Engine then uses the Display engine 810 to display the results to the user in textual and graphical form.

Figure 9:
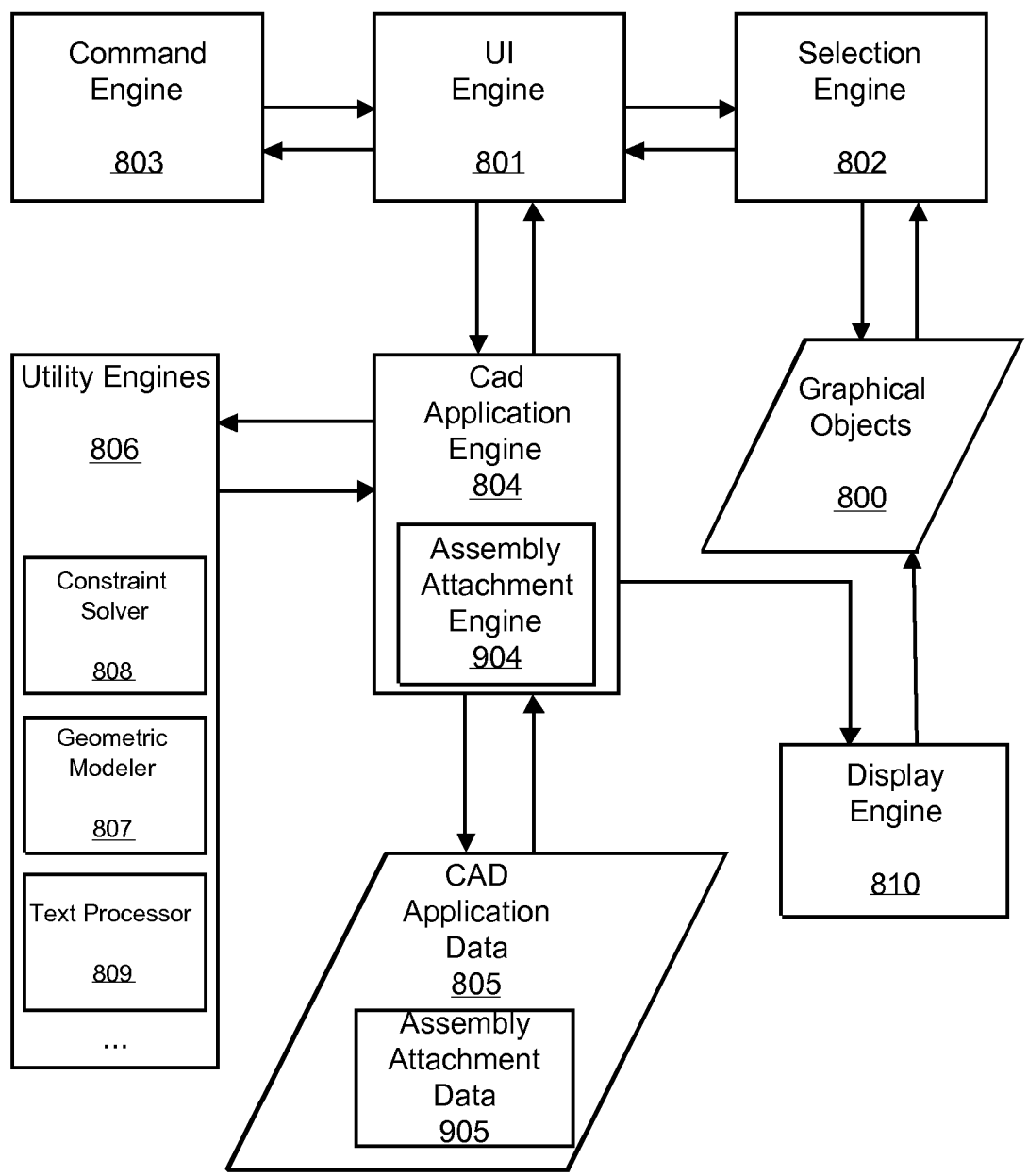
FIG. 9 is a flowchart illustrating a more detailed view of the major components of a typical CAD program, specifically pointing out the areas of a CAD program that are impacted by one embodiment of the present invention.

FIG. 9 shows a more detailed view of the major components of a CAD program according to an exemplary embodiment of the present invention, specifically pointing out the modified areas of the CAD program. These include the Assembly Attachment data structure 905 which may be considered a separate area within CAD application data structure 805, and the Assembly Attachment Application engine 904 which may, in some embodiments, form a part of CAD application engine 804. Within the detailed description of the embodiments below, all process changes described take place in Assembly Attachment Application engine 904 and all data structure changes take place in Assembly Attachment data structure 905. It is also noted that the present invention modifies the inputs to and outputs to and from the prior art Constraint Solver 808 in order to achieve the above-noted advantages, but that the prior art Constraint Solver 808 fulfills the requirements of an embodiment of the present invention.

In the implementation described herein, a number of CAD data structures will be used repeatedly in the pseudo-code descriptions of an exemplary embodiment of the present invention. These data structures are defined below. The pseudo-code examples in the embodiments presented use the well known, object oriented paradigm so the terms "object" and "data structure" are interchangeable in these examples. However, one of ordinary skill in the art will readily appreciate that the software aspects of the present invention could be embodied in any software language or paradigm.

```
// Copyright, LCDesign, Inc. 2008
// The GeometricCondition object represents an condition that
// must be satisfied when a Position is defined implicitly
Class GeometricCondition
{
    ConditionType type;   // type of condition - touching, parallel, etc.
    Geometry geom1;       // 1st geometry in condition
    Geometry geom2;       // 2nd geometry in condition
}
// The Position object represents a single discrete orientation along one degree of
// freedom in a Connection. The position can be defined explicitly, as a discrete
// value, or implicitly, as the discrete value that satisfies specified geometric
// conditions.
Class Position
{
    PositionType positionType;       // angle, distance, other
    DefinitionType definitionType;   // implicit or explicit
    List< GeometricCondition > conditions; // if the position is defined implicitly,
                                     // a list of geometric conditions that must
                                     // be satisfied to define the position
    Double value;                    // the discrete value of the position
    String name;                     // the user-visible name of the position
}
// The ConnectionSide object represents one side of the connection.
Class ConnectionSide
{
    Point3D origin;      // origin of connection side
    Vector3D xline;      // X axis direction of connection side
    Vector3D yline;      // Y axis direction of connection side
    Vector3D zline;      // Z axis direction of connection side
    Part owningPart;     // the part on which the connection side exists
}
// The PositionSet object represents a set of Positions described along
// one degree of freedom of a Connection. It also specifically allows the
// definition of the limits of motion along that degree of freedom.
Class PositionSet
{
    PositionType positionType;    // the type of the degree of freedom
    List<Position> positions; // a list of positions defined in this freedom
    Position limitStart; // if the motion is limited, the start position
    Position limitEnd; // if the motion is limited, the end position.
}
// The Connection object represents a single connection between two parts.
// It also contains a set of positions along each degree of freedom. (In this
// embodiment, only two degrees of freedom are shown, but the extension
// to more degrees is trivial).
Class Connection
{
    ConnectionType type; // type of connection - rigid, rotating, sliding, etc.
    ConnectionSide side1; // side on first connected part
    ConnectionSide side2; // side on second connected part
    int numDegreesOfFreedom; // number of degrees of freedom in connection
    PositionSet positionSet1; // positions defined along first degree of freedom
    PositionSet positionSet2; // positions defined along 2nd degree of freedom
    Boolean isMarked = false; // temporary flag used to find rigid sets
}
// The part object represents a single part. While a part object in a CAD software
// product would typically have more data, only the data needed to describe the
// embodiment of the invention are shown
Class Part
{
    List<Connection> connections; // list of connections to this part
    Boolean isMarked = false; // temporary flag used to find rigid sets
    Matrix orientation; // a 4x4 matrix orienting the part in assembly space
    Geometry modelGeometry;   // the part's geometry in part space (underlying
                              // details typical to any 3D CAD software)
}
// The assembly object represents a single part. While an assembly object in a
// CAD software product would typically have more data, only the data need to
// describe the embodiment of the invention are shown
Class Assembly
{
    List<Part> parts; // list of parts in this assembly
}
// end of object definitions
```

The following examples present specific situations in a CAD software environment. Within each example, the portion of the embodiment of the proposed invention exercised within the example is presented in detail. Taken together, the examples demonstrate all aspects of the invention needed by one of ordinary skill in the art to make and use the present invention without undue experimentation. Within some portions, a typical constraint solver of the type well known in the art will be invoked. One of ordinary skill in the art will readily appreciate that a typical constraint solver as exists in the prior art can be used to solve the problems presented. Thus, the constraint solver is not a part of the invention and is presented within the detailed description of the embodiment as a black box.

Most of the examples below describe creating connections based on connection sides that are defined in terms of a circular hole on a planar face. In fact, the connection side as described in this embodiment is exactly the same physical structure as a "local coordinate system" data structure that has existed in most commercial 3D CAD software products for over twenty years. The prior art supports defining a local coordinate system rigidly in any desired orientation relative to a part and how to do so is well understood to a CAD software developer of ordinary skill in the art. Therefore, while the embodiment above describes creating connections based on connection sides that are defined in terms of a circular hole on a planar face, it can be logically extended to defining connections in terms of connection sides defined on a part in any orientation on the part. As such, the examples described can be logically extended to cover connecting any two parts in any desired orientation.

The first example is defining a rigid connection between two parts. In the prior art, creating such an orientation usually would have required three mates. Various combinations could be used, but one example is a concentric mate between the two cylindrical faces, a coincident mate between the two touching planar faces, and a parallel mate between the two side faces. The three mates must be analyzed together to determine that the two parts are rigidly connected. In this embodiment of the invention, there is just one rigid connection and it is known a priori that the two parts are rigidly connected.

Figure 10A:
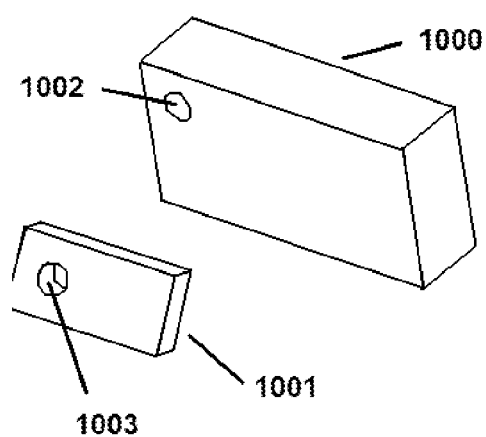
FIG. 10A shows a before view of defining a rigid connection between two parts, according to one embodiment of the present invention.
Figure 10B:
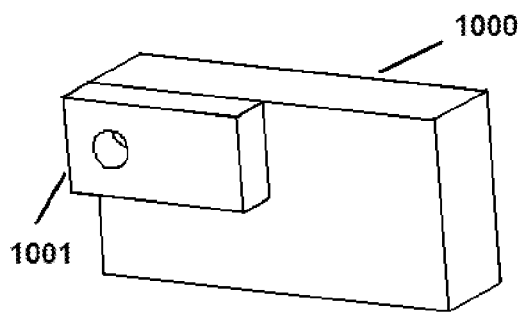
FIG. 10B shows an after view of defining a rigid connection between two parts, according to one embodiment of the present invention.
Figure 11:
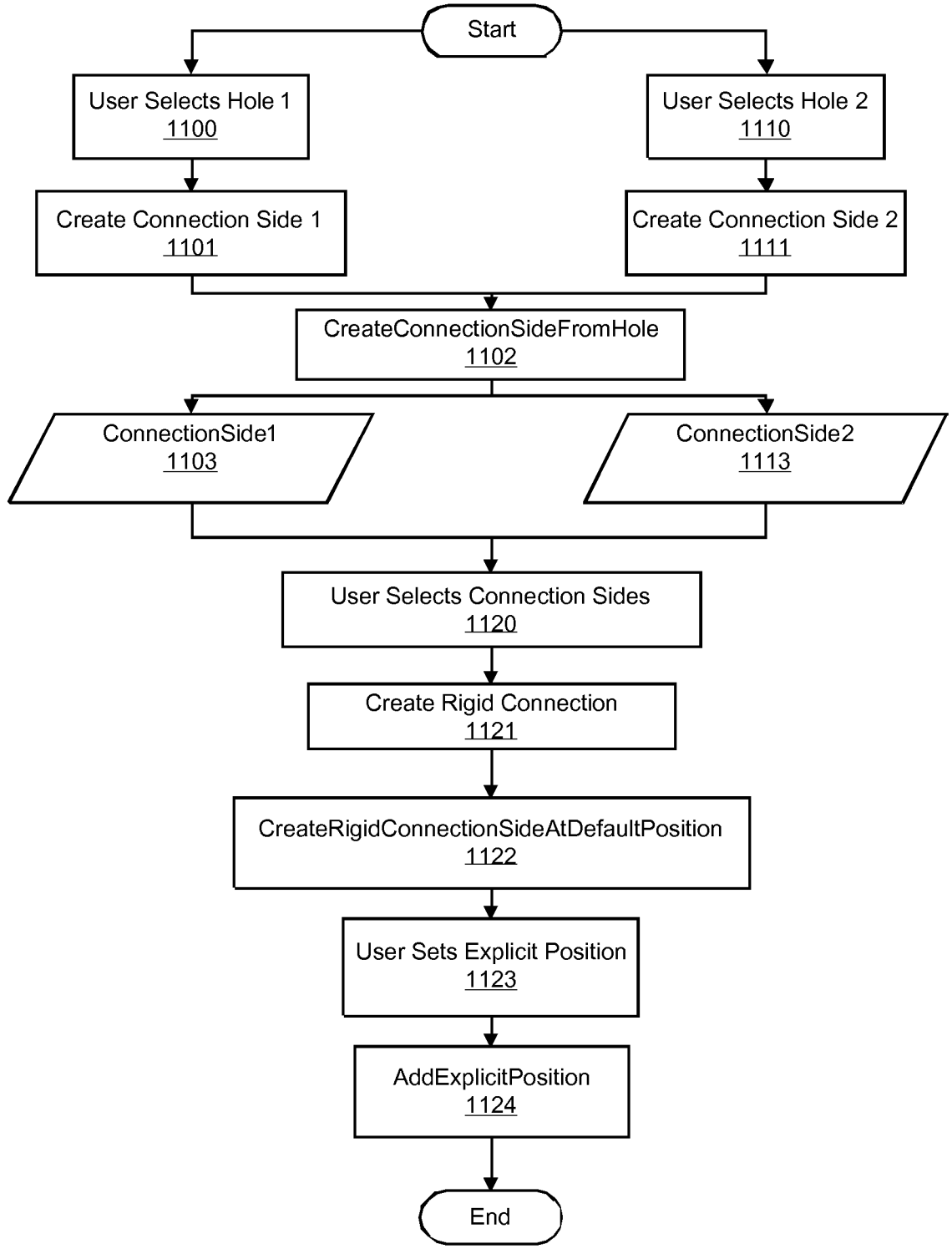
FIG. 11 is a flowchart illustrating the process of defining a rigid connection between two parts, according to one embodiment of the present invention.

FIG. 10A and FIG. 10B show a before and after view respectively of defining a rigid connection between two parts. Parts 1000 and 1001 are shown, each with a circular hole (1002 and 1003 respectively) on a planar face. The overall process is shown in the flowchart in FIG. 11. First, in step 1100, the user selects the graphical hole 1002 on part 1000 and commands the system, via Command Engine 803 and UI Engine 801, to create a connection side based on said selected hole in step 1101. Next, the system executes CreateConnectionSideFromHole algorithm 1102, with said selected hole as input, to create the ConnectionSide1 object 1103 as output.

CreateConnectionSideFromHole algorithm 1102 operates, in one exemplary embodiment, according to the pseudo-code example below:

```
// Copyright, LCDesign, Inc. 2008
// The function CreateConnectionSideFromHole takes a selection of a hole as
// input and returns a ConnectionSide object that is aligned with the hole
// on the nearest end plane of the hole to the selection. Since the hole is round, there
// are 360 degrees of valid ConnectionSides that could be returned. The
// algorithm chooses the one that is most aligned with the part's coordinate system.
ConnectionSide CreateConnectionSideFromHole (HoleSelection holeSelectionIn)
{
    // get the end plane and cylinder of the hole
    Plane plane1 = holeSelectionIn.GetNearestEndPlaneToSelection( );
    Cylinder cyl1 = holeSelectionIn.GetCylinderFromHole( );
    // create a circle from the intersection of the plane and cylinder
    Circle circle1 = CreateCircleFromPlaneAndCylinderIntersection(plane1,cyl1);
    // use the centerpoint of circle for origin of the ConnectionSide
    Point origin = circle1.GetCenterPoint( );
    // use the normal to the plane as the z-axis of the ConnectionSide
    Vector zLine = plane1.GetNormalToPlane( );
    // compute an x-axis of the connection side that is both normal
    // to the z-axis and best aligned with the part's coordinate system
    Vector xLine = FindBestNormalVector(zLine);
    // create a y-axis which is mutually orthogonal to the other axes
    Vector yLine = VectorCrossProduct(zLine,xLine);
    // construct a connection side from the data
    ConnectionSide connSideOut =
new ConnectionSide(origin, xLine, yLine, zLine, holeSelectionIn.OwningPart);
    // return the connection side
    Return connSideOut;
}
// the utility function FindBestNormalVector takes a vector as input and
// creates a vector normal to it. Though any normal vector is acceptable, it
// prefers one that is aligned with the x, y or z axis of the space of the part
Vector FindBestNormalVector(Vector vectorIn)
{
    // first find the x, y or z direction vector which is smallest relative
    // to the input vector;
    Vector vectorToCross;
    if (vectorIn.X < vectorIn.Y and vectorIn.X < vectorIn.Z)
        vectorToCross = new Vector (1,0,0); // x vector if x coord. is smallest
    else if (vectorIn.Y < vectorIn.X and vectorIn.Y > vectorIn.Z)
        vectorToCross = new Vector (0,1,0); // y vector if y coord. is smallest
    else
        vectorToCross = new Vector (0,0,1); // z vector if z coord. is smallest
    // cross the vector chosen with the input vector to produce the best normal
    // vector
```

```
    Vector bestVectorOut = VectorCrossProduct(vectorIn,vectorToCross);
    // return the best normal vector
    return bestVectorOut;
}
// the remaining classes and functions referenced in this algorithm are typical
// in any 3D CAD Solid Modeler software environment and are not
// unique to or changed by this invention, and so are not described in detail
```

Figure 12:
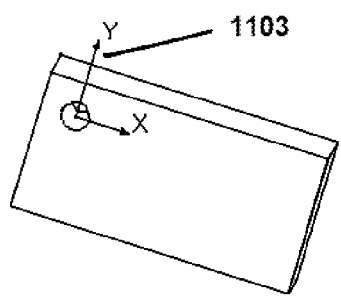
FIG. 12 shows the display of the ConnectionSide1 object defined in the process of defining a rigid connection between two parts, according to one embodiment of the present invention.
Figure 13:
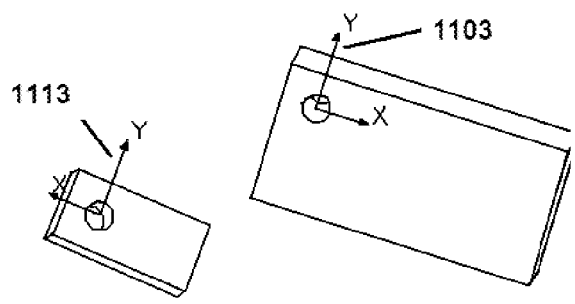
FIG. 13 shows the display of the ConnectionSide2 object defined in the process of defining a rigid connection between two parts, according to one embodiment of the present invention.

The resulting ConnectionSide1 object 1103 is then displayed graphically as shown in FIG. 12. The user repeats the same process on the second part 1001 by selecting the graphical hole object 1003 in step 1100. The user then commands the system, via Command Engine 803 and UI Engine 801, to create a connection side based on said selected hole in step 1111. Next, the system executes CreateConnectionSideFromHole algorithm 1102, with selected hole 1003 as input, to create the ConnectionSide2 object 1113 as output. The resulting ConnectionSide2 object 1113 is then displayed graphically as shown in FIG. 13.

The user then selects the ConnectionSide1 object 1103 and the ConnectionSide2 object 1113 in step 1120. The user then instructs the CAD system to create a rigid connection between these two connection sides in step 1121.

Figure 14:
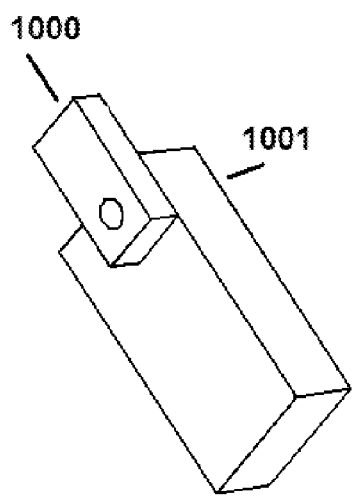
FIG. 14 shows the display of two parts connected by a rigid connection in a default position, according to one embodiment of the present invention.

In this example, based on what the user has selected so far, there are a full 360 degrees of equally correct orientations for the resulting connection. The system then executes CreateRigidConnectionSideAtDefaultPosition algorithm 1122 to produce a Rigid Connection as output. This results in the initial orientation of parts 1000 and 1001 shown in FIG. 14.

CreateRigidConnectionSideAtDefaultPosition algorithm 1122 operates, in some embodiments of the present invention, as follows:

```
// Copyright, LCDesign, Inc. 2008
// The function CreateRigidConnectionAtDefaultPosition
// creates a rigid connection and sets it to be at the default position
Connection CreateRigidConnectionAtDefaultPosition(
        ConnectionSide side1In, ConnectionSide side2In)
{
        // create the new connection
        Connection newConnection =
            CreateConnectionFromConnectionSides (
        ConnectionType.Rigid, side1In, side2In);
        // add an angle position set to the connection
        newConnection.positionSet1 = new PositionSet(PositionType.Angle);
        // add a position to the position set named "default" at angle 0
        newConnection.positionSet1.AddExplicitPosition(0.0, "default");
        // return the connection
        return newConnection;
}
// The function CreateRotatingConnectionAtDefaultPosition
// creates a rotating connection and sets it to be at the default position
Connection CreateRotatingConnectionAtDefaultPosition(
        ConnectionSide side1In, ConnectionSide side2In)
{
        // create the new connection
        Connection newConnection =
            CreateConnectionFromConnectionSides (
        ConnectionType.Rotating, side1In, side2In);
        // add an angle position set to the connection
        newConnection.positionSet1 = new PositionSet(PositionType.Angle);
        // add a position to the position set named "default" at angle 0
        newConnection.positionSet1.AddExplicitPosition(0.0, "default");
        // return the connection
        return newConnection;
}
// The function CreateSlidingConnectionAtDefaultPosition
// creates a sliding connection and sets it to be at the default position
Connection CreateSlidingConnectionAtDefaultPosition(
        ConnectionSide side1In, ConnectionSide side2In)
{
        // create the new connection
        Connection newConnection =
            CreateConnectionFromConnectionSides (
        ConnectionType.Sliding, side1In, side2In);
        // add an angle position set to the connection
        newConnection.positionSet1 = new PositionSet(PositionType.Distance);
        // add a position to the position set named "default" at distance 0
        newConnection.positionSet1.AddExplicitPosition(0.0, "default");
        // return the connection
        return newConnection;
}
// The function CreateConnectionFromConnectionSides takes two connection
// sides, and a connection type as input, and creates a Connection of that type
```

```
Connection CreateConnectionFromConnectionSides (ConnectionType typeIn,
    ConnectionSide side1In, ConnectionSide side2In)
{
    // align the two connection sides at angle 0.0
    AlignTwoConnectionSides(side1In, side2In, 0.0);
    // create a connection from the two connection sides
    Connection newConnection = new Connection(typeIn, side1In, side2In);
    // return the new connection
    Return newConnection;
}
// The function AddExplicitPosition creates a new Position defined at
// the input discrete value within the position set with the input name
Position Connection.AddExplicitPosition(double value, string name)
{
    // create the new explicit position
    Position newPosition = new Position(this.PositionType,
    DefinitionType.Explicit, value, name);
    // add it to the list of positions in this position set
    this.positions.AddToList(newPosition);
    // align the connection at this position
    AlignTwoConnectionSides(this.side1In, this.side2In, value);
    return newPosition;
}
// This function aligns two parts by transforming the parts so that the input
// connection sides (one on each part) are coincident. It creates a
// small constraint system and solves it to calculate the transforms, but it could
// have done it just using algebra as well. With an angleIn of 0.0, they will be exactly
// aligned. With an angleIn of a different value, they will be rotated by that angle.
Void AlignTwoConnectionSides(ConnectionSide side1In, ConnectionSide side2In,
    double angleIn)
{
    // first add the origins and z-lines of connection sides to the Solver
    CPoint pt1 = ConstraintSolver.AddPoint(side1In.Origin);
    CPoint pt2 = ConstraintSolver.AddPoint(side2In.Origin);
    CLine xln1 = ConstraintSolver.AddLine(side1In.Xline);
    CPoint xln2 = ConstraintSolver.AddLine(side2In.XLine);
    CLine zln1 = ConstraintSolver.AddLine(side1In.Zline);
    CPoint zln2 = ConstraintSolver.AddLine(side2In.ZLine);
// then constrain the origins to be coincident, z-lines to be coincident
// and the z-lines at the specified angle
    ConstraintSolver.AddConstraint(pt1,pt2,ConstraintType.Coincident);
    ConstraintSolver.AddConstraint(zln1,zln2,ConstraintType.Coincident);
    ConstraintSolver.AddConstraint(xln1,xln2,ConstraintType.Angle, angleIn);
    // add two empty rigid bodies to the Solver to represent part1 and part2
    // at the current orientations of the two parts
    CRigidBody body1 = ConstraintSolver.AddRigidBody(part1.orientation);
    CRigidBody body2 = ConstraintSolver.AddRigidBody(part2.orientation);
    // add the part 1 geometry to rigid body 1
    ConstraintSolver.AddGeometryToRigidBody((body1 ,pt1);
    ConstraintSolver.AddGeometryToRigidBody((body1,xln1);
    ConstraintSolver.AddGeometryToRigidBody((body1,zln1);
    // add the part 2 geometry to rigid body 2
    ConstraintSolver.AddGeometryToRigidBody((body2,pt2);
    ConstraintSolver.AddGeometryToRigidBody((body2,xln2);
    ConstraintSolver.AddGeometryToRigidBody((body2,zln2);
    // solve the constraint system you have created. This will create
    // transformation matrices that move rigid body1 and rigid body2
    // so that that the geometries are aligned
    ConstraintSolver.SolveConstraints( );
    // extract the transformation matrices from the Solver
    Matrix transform1 = body1.GetSolveTransform( );
    Matrix transform2 = body2.GetSolveTransform( );
    // get the parts from the connection sides
    Part part1 = side1In.GetPart( );
    Part part2 = side2In.GetPart( );
    // apply the transforms to the parts. This will move the parts so that
    // the connection sides align
    part1.ApplyTransform(transform1);
    part1.ApplyTransform(transform2);
    return;
}
// the remaining classes and functions used in this algorithm exist in a similar
// form in any 3D CAD Solid Modeler software environment and are not
// unique to or changed by this invention
// the representation of the Constraint Solver employed by this algorithm is a
// typical implementation of an off the shelf Constraint Solver software component.
```

Figure 15:
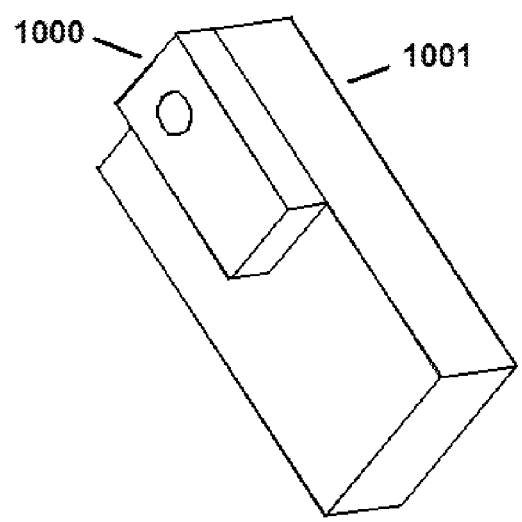
FIG. 15 shows the display of two parts connected by a rigid connection in an adjusted position, according to one embodiment of the present invention.

The user is then prompted, in step 1123, by the system to define the desired alignment using either a specific value or a geometric condition. The user chooses to use a specific value of 180 degrees. The system then calls the AddExplicitPosition method 1124 with a value of 180 degrees, which modifies the orientations of the connected parts to satisfy the desired alignment. (The AddExplicitPosition method 1124 is described in pseudo-code above). The system then displays the connected parts 1000 and 1001 to the user via the UI based on as shown in FIG. 15. The result is a rigid connection between the two parts with the specified alignment.

The second example illustrates an alternative embodiment of example 1, in which the connection sides are defined implicitly rather than explicitly. This example demonstrates an alternative user interaction. The before and after results are the same as in the first example as was shown in FIGS. 10A and 10B respectively.

Figure 16:
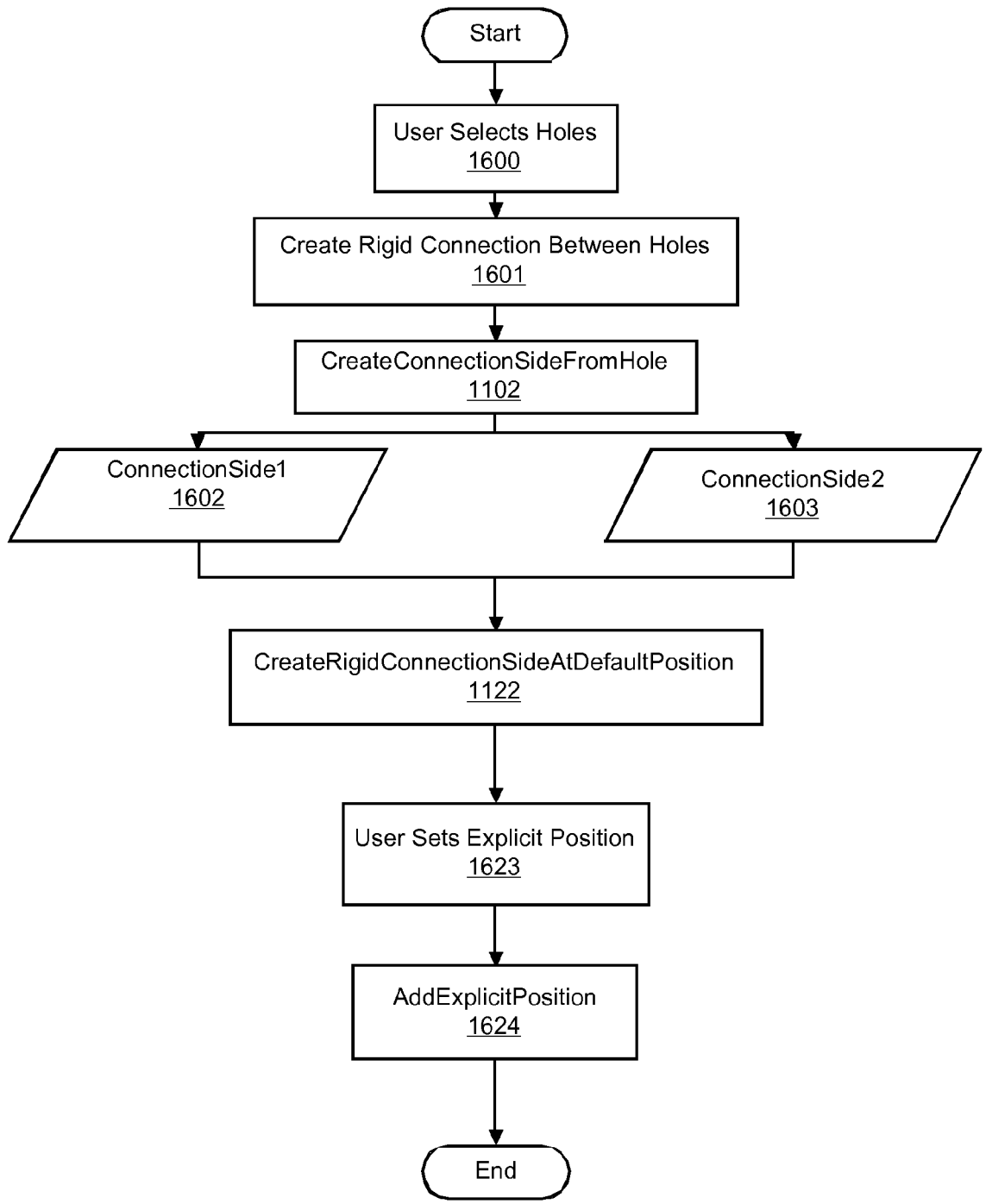
FIG. 16 is a flowchart illustrating the process of defining the connection sides implicitly rather than explicitly, according to one embodiment of the present invention.

The overall process is shown in the flowchart in FIG. 16. First, in step 1600, the user selects the graphical hole 1002 on part 1000 and hole 1003 on part 1001, via Command Engine 803 and UI Engine 801, and commands the system in step 1601 to create a rigid connection between the two holes. Next, the system executes CreateConnectionSideFromHole algorithm 1102, with selected hole 1002 as input, to create the ConnectionSide1 object 1602 as output. Then, the system again executes CreateConnectionSideFromHole algorithm 1102, with selected hole 1003 as input, to create the ConnectionSide2 object 1603 as output. The connection side object need not ever be apparent to the user in this embodiment.

As in the prior example, based on what the user has selected so far, there are a full 360 degrees of equally correct orientations for the resulting connection. The system then executes CreateRigidConnectionSideAtDefaultPosition 1122 algorithm, with connection sides 1602 and 1603 as input, to produce the Rigid Connection as output. This results in the alignment of parts 1000 and 1001 shown in FIG. 14. The remainder of the process as shown in steps 1623 through 1624 is exactly the same as described in the first example from steps 1123 through 1124, again resulting in the alignment shown in FIG. 15. This example demonstrates an alternative embodiment in which the user makes the rigid connection in one step between the two holes. The connection side object need not ever be apparent to the user in this embodiment.

In the third example, the user creates a rotating connection between two parts, rather than a rigid connection, as was described in the first example.

Figure 17:
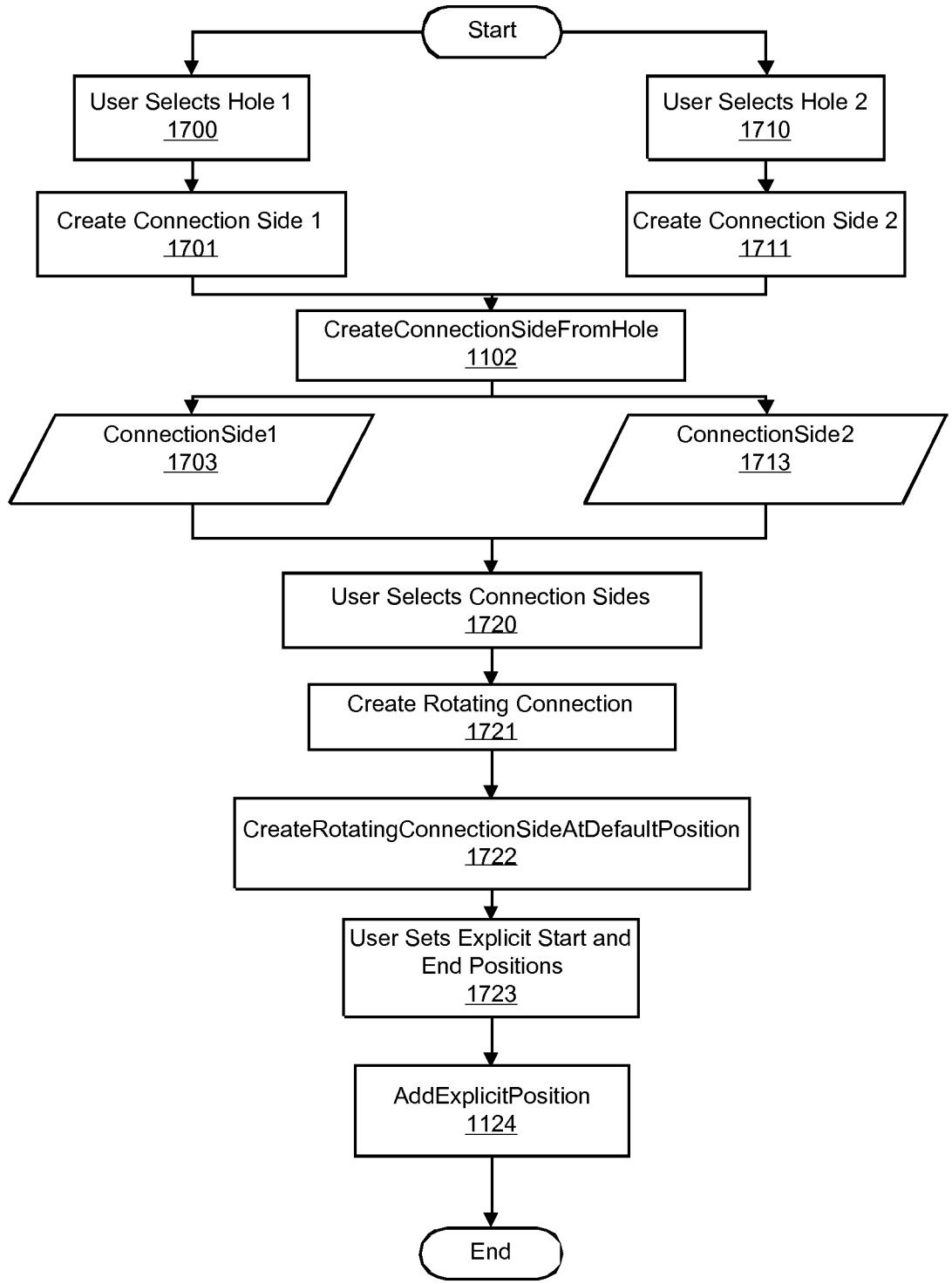
FIG. 17 is a flowchart illustrating the process of defining a rotating connection, according to one embodiment of the present invention.
Figure 18:
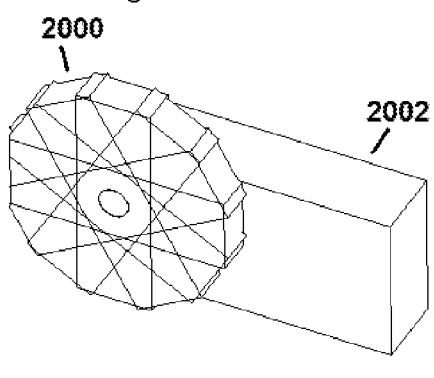
FIG. 18 shows the display of the default unlimited rotation of a newly created rotating connection, according to one embodiment of the present invention.
Figure 19:
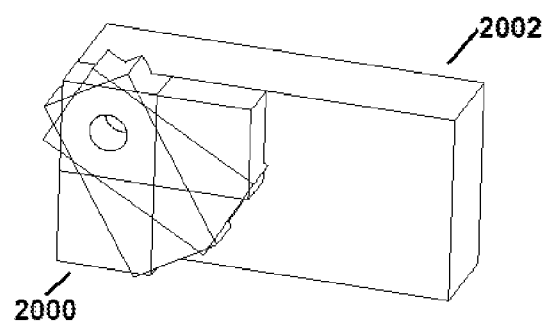
FIG. 19 shows the display of the limited rotation of a newly created rotating connection, according to one embodiment of the present invention.

Refer to the flowchart in FIG. 17. Steps 1700 through 1720 proceed exactly as described in the corresponding steps 1100 through 1120 in the first example. In step 1721, the user instructs the system to create a rotating connection instead of a rigid connection. This executes the CreateRotatingConnectionAtDefaultPosition function 1722, which was described in pseudo-code earlier. The connection is able to rotate a full 360 degrees as shown in FIG. 18. In step 1723, the user chooses to apply limits to the rotation of the connection and specifies the start position as 0 degrees and the end position as 90 degrees. The system then executes the AddExplicitPosition algorithm 1124, with an input angle of zero degrees to create the start position as output. The system then executes the AddExplicitPosition algorithm 1124 with an input angle of ninety degrees to create the end position. The rotating connection now rotates only between zero and ninety degrees as shown in FIG. 19.

In the prior art, creating such a rotating connection would require two mates. Various combinations could be used, but one example is a concentric mate between the two cylindrical faces and a coincident mate between the two touching planar faces. At this stage, part2 would be able to rotate 360 degrees. However, the initial orientation would be unspecified. To create the initial, start, and end positions, the easiest method in the prior art would be to add an angle mate that constrains the two parts at the desired angle. However, once such an angle mate was added, the parts would be rigidly constrained and thus would no longer be able to rotate. In order to define the other two positions, the value of the angle mate could be changed to 0 degrees and 90 degrees. In order to allow the parts to rotate again, the angle mate would need to be disabled. There is no specification that the movement is limited and there is no convenient way to demonstrate the limited movement. In this embodiment of the invention, there is one rotating connection; it is known a priori that the two parts are connected in a way that rotates; the preferred position is known; the limits of movement are known; it is convenient to animate the limited movement, and no constraint solving is required to perform any of these functions.

The fourth example is similar to the third example, except that the end position limit of movement is defined implicitly instead of explicitly. This means that the user defines the end position by entering a condition to be satisfied rather than an explicit value of ninety degrees.

Figure 20:
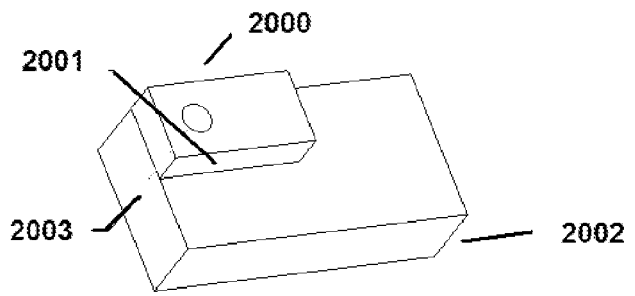
FIG. 20 shows the display of the planar faces used to define the limiting position of rotation of newly created rotating connection, according to one embodiment of the present invention.
Figure 21:
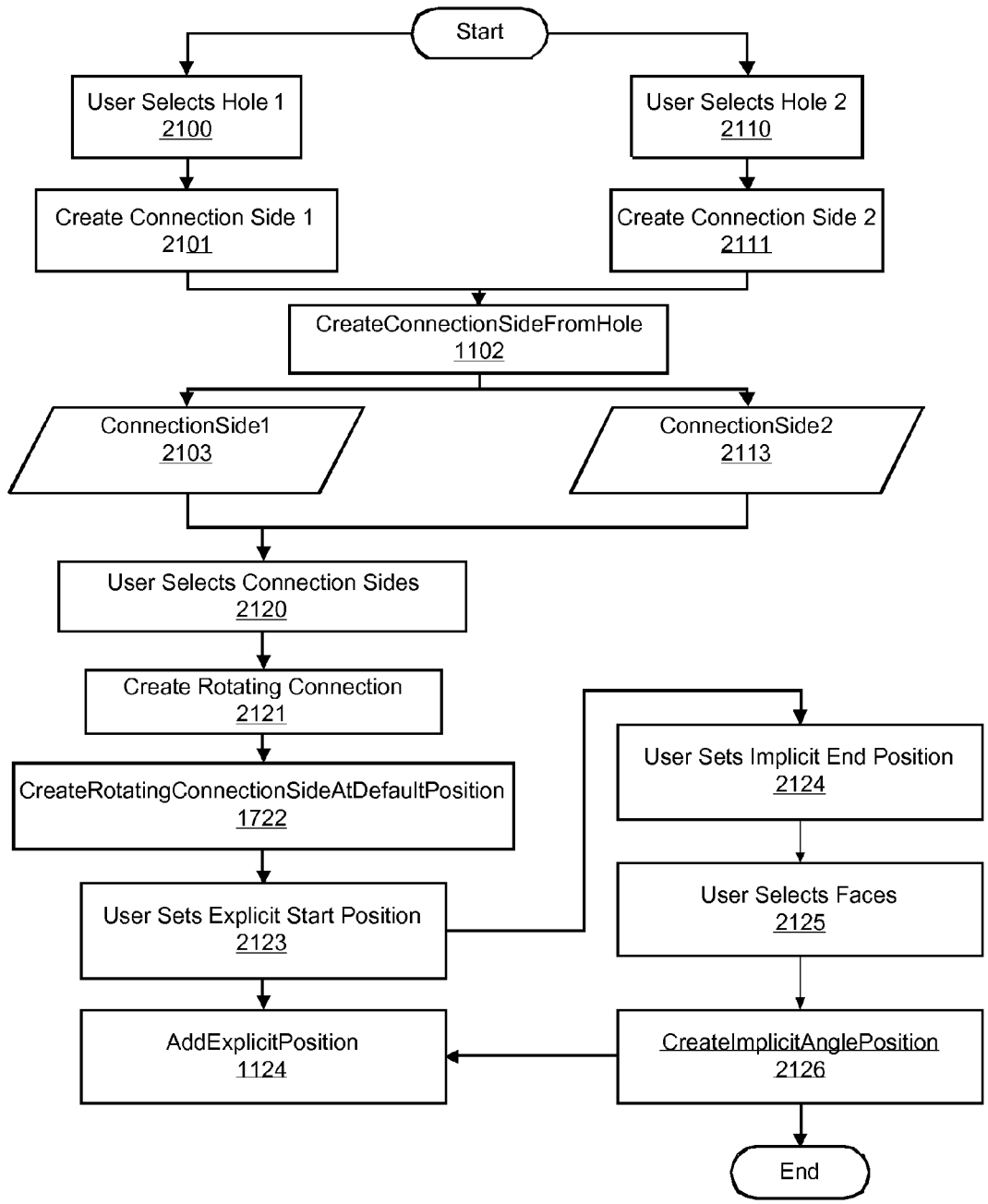
FIG. 21 is a flowchart illustrating the process of defining the limiting position of rotation of newly created rotating connection, according to one embodiment of the present invention.

FIG. 20 is a graphical depiction of the fourth example. FIG. 21 is a flowchart of the steps in the fourth example. Steps 2100 through 1722 proceed in exactly the same manner as steps 1700 through 1722 in the third example. In step 2123, the user still chooses to enter the start position explicitly as zero degrees as in the third example. The system then calls the AddExplicitPosition method 1124 to set the start angle. Then, in step 2124, the user chooses to define the end position implicitly by specifying that the end position is implicitly defined when two specified faces meet. In step 2125, the user then selects faces 2001 and 2003, as shown graphically in FIG. 20. Then the system determines that the value of the angle at which that constraint is satisfied is 90 degrees, using the CreateImplicitAnglePosition 2126 algorithm described in pseudo-code below. Note this algorithm uses a constraint solver to find the angle. In a different embodiment, the angle could be determined using simple geometric calculations.

```
// Copyright, LCDesign, Inc. 2008
// algorithm to create an implicit angle position given a geometric
condition Position CreateImplicitAnglePosition(Connection connectionIn,
GeometricCondition conditionIn)
{
    // extract the connection sides from the connection
    ConnectionSide side1In = connectionIn.side1;
    ConnectionSide side2In = connectionIn.side2;
    // get the matrix of part 2 before solving for the implicit position
    Matrix matrix2Before = side2In.owningPart.matrix;
    // first add the origins and z-lines of connection sides to the Solver
    CPoint pt1 = ConstraintSolver.AddPoint(side1In.Origin);
    CPoint pt2 = ConstraintSolver.AddPoint(side2In.Origin);
    CLine zln1 = ConstraintSolver.AddLine(side1In.Zline);
    CPoint zln2 = ConstraintSolver.AddLine(side2In.ZLine);
    // then constrain the origins to be coincident and z-lines to be coincident
    ConstraintSolver.AddConstraint(pt1,pt2,ConstraintType.Coincident);
    ConstraintSolver.AddConstraint(zln1,zln2,ConstraintType.Coincident);
    // add the constraint derived from the input GeometryCondition
    CPlane plane1 = ConstraintSolver.AddPlane(conditionIn.plane1);
    CPlane plane2 = ConstraintSolver.AddPlane(conditionIn.plane2);
    ConstraintSolver.AddConstraint(plane1, plane2,
    ConstraintType.Coincident);
    // add two empty rigid bodies to the Solver to represent part1 and part2
```

-continued

```
CRigidBody body1 = ConstraintSolver.AddRigidBody( );
CRigidBody body2 = ConstraintSolver.AddRigidBody( );
// fix the rigid body1 so only part2 moves
ConstraintSolver.FixBody(body1);
// add the part 1 geometry to rigid body 1
ConstraintSolver.AddGeometryToRigidBody((body1,pt1);
ConstraintSolver.AddGeometryToRigidBody((body1,zln1);
ConstraintSolver.AddGeometryToRigidBody((body1,plane1);
// add the part 2 geometry to rigid body 2
ConstraintSolver.AddGeometryToRigidBody((body2,pt2);
ConstraintSolver.AddGeometryToRigidBody((body2,zln2);
ConstraintSolver.AddGeometryToRigidBody((body2,plane2);
// solve the constraint system you have created. This will create
// transformation matrices that move rigid body1 and rigid body2
// so that that the constraints are satisfied
ConstraintSolver.SolveConstraints( );
// extract the transformation matrix2 from the Solver
Matrix matrix2After = body2.GetSolveTransform( );
// calculate the angle between between the matrix before and the matrix
// after about the z-axis. This is the angle that satisfies the input Geometric
// Condition
Double angle = CalculateRotation(matrix2Before, matrix2After, zln2);
// create an implicit position object recording the angle and the
// condition
Position newPosition = new Position (PositionType.Angle,
    AlignmentType.Implicit, conditionIn, angle);
// return the implicit position
return newPosition;
```

Then the system sets the end position to the calculated angle by calling the AddExplicitPosition method 1124. The rotating connection now rotates only between zero and ninety degrees as shown in FIG. 19.

Figure 22:
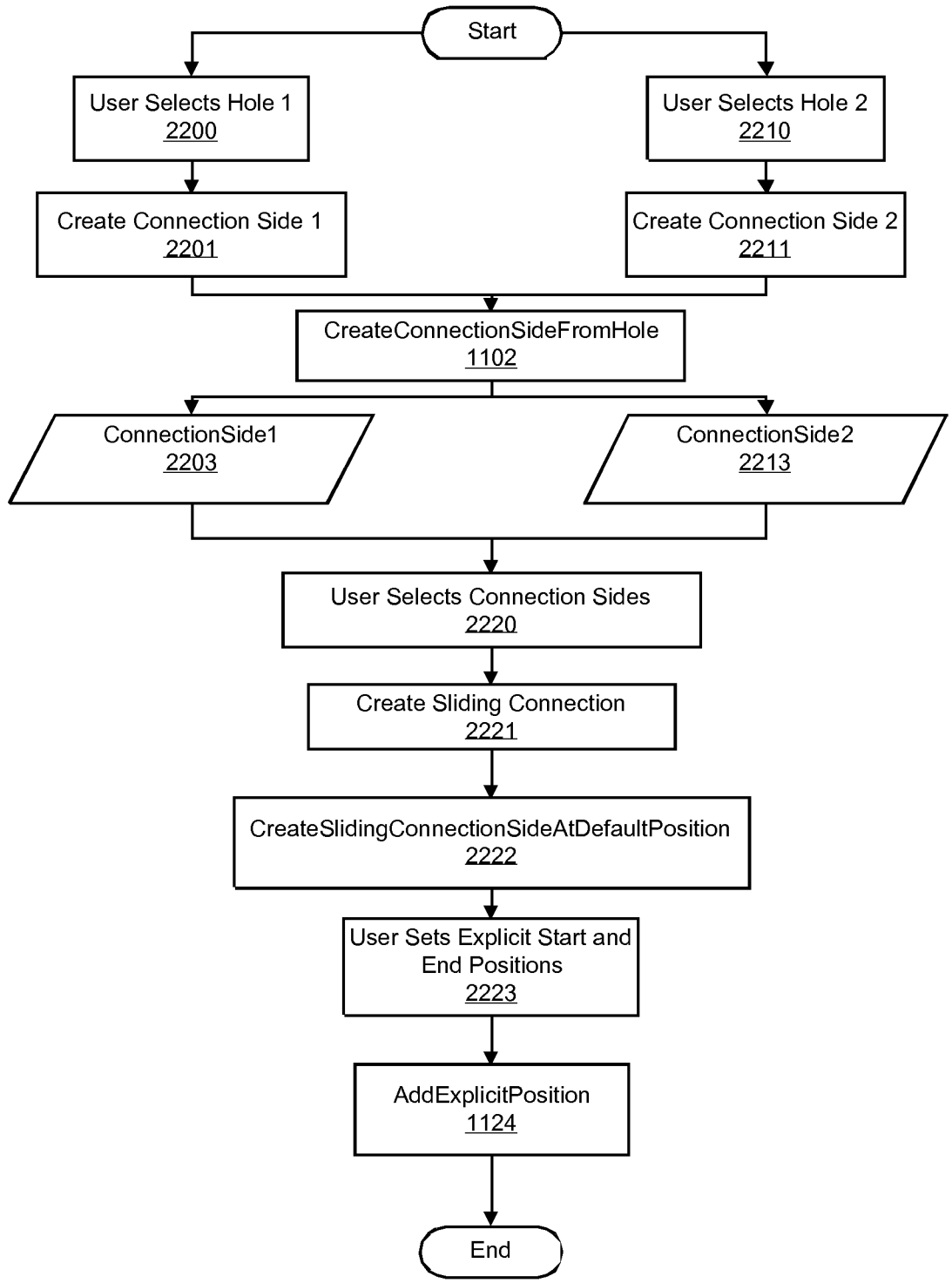
FIG. 22 is a flowchart illustrating the process of defining a sliding connection, according to one embodiment of the present invention.

In the fifth example, the user creates a sliding connection between two parts, rather than a rotating connection, as was shown in the third example. FIG. 22 shows the flowchart for the fifth example.

Figure 23:
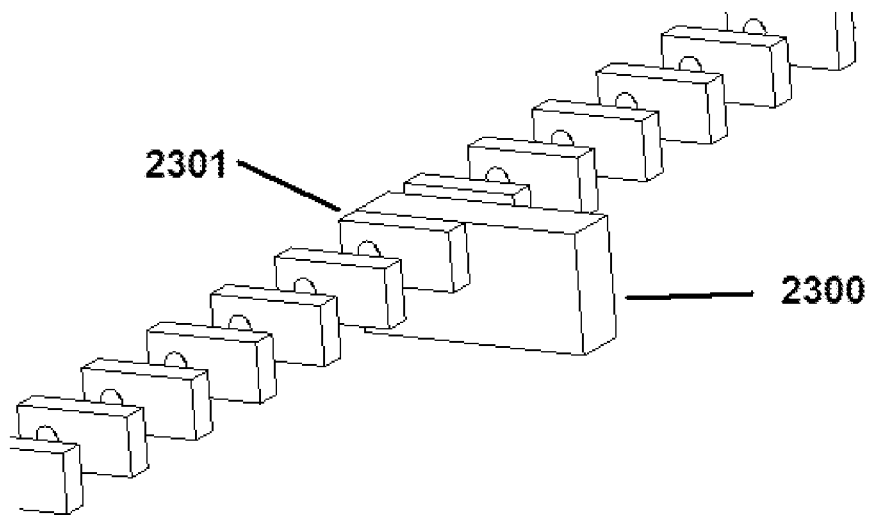
FIG. 23 shows the display of the default unlimited movement of a newly created sliding connection, according to one embodiment of the present invention.
Figure 24:
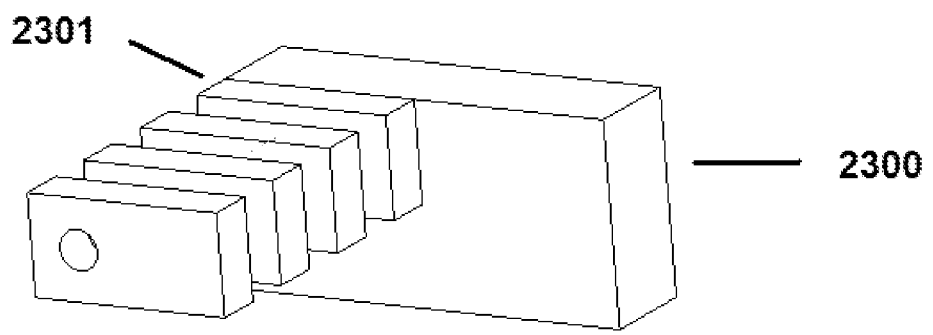
FIG. 24 shows the display of the limited movement of a newly created sliding connection, according to one embodiment of the present invention.

Steps 2200 through 2220 proceed exactly as steps 1700 through 1720 in the third example. In step 2221, the user instructs the system to create a sliding connection rather than a rotating connection. The system then executes the CreateSlidingConnectionAtDefaultPosition function 2222, which was described earlier in pseudo-code. As depicted in FIG. 23, Part 2301 is now free to slide forward and backward relative to part 2300. In step 2223, the user chooses to limit the movement of the connection and specifies the and the start position as zero inches and the end position as five inches. The system then executes the AddExplicitPosition algorithm 1124, with an input angle of zero inches to create the start position. The system again executes the AddExplicitPosition algorithm 1124, with an input angle of 5 inches to create the end position. Part 2301 is now free to slide forward and backward relative to part 2300 only between these values as shown in FIG. 24.

Note that it follows that the user could similarly choose to create a sliding and rotating connection and limit its motion along both degrees of freedom as discussed above. It also follows that there are more complex types of moving connections that can be defined in similar manner, for example, a spiral connection. The choice of which moving connection types are worth creating should be determined based on the needs of the CAD software in which those connections would be used.

Figure 25:
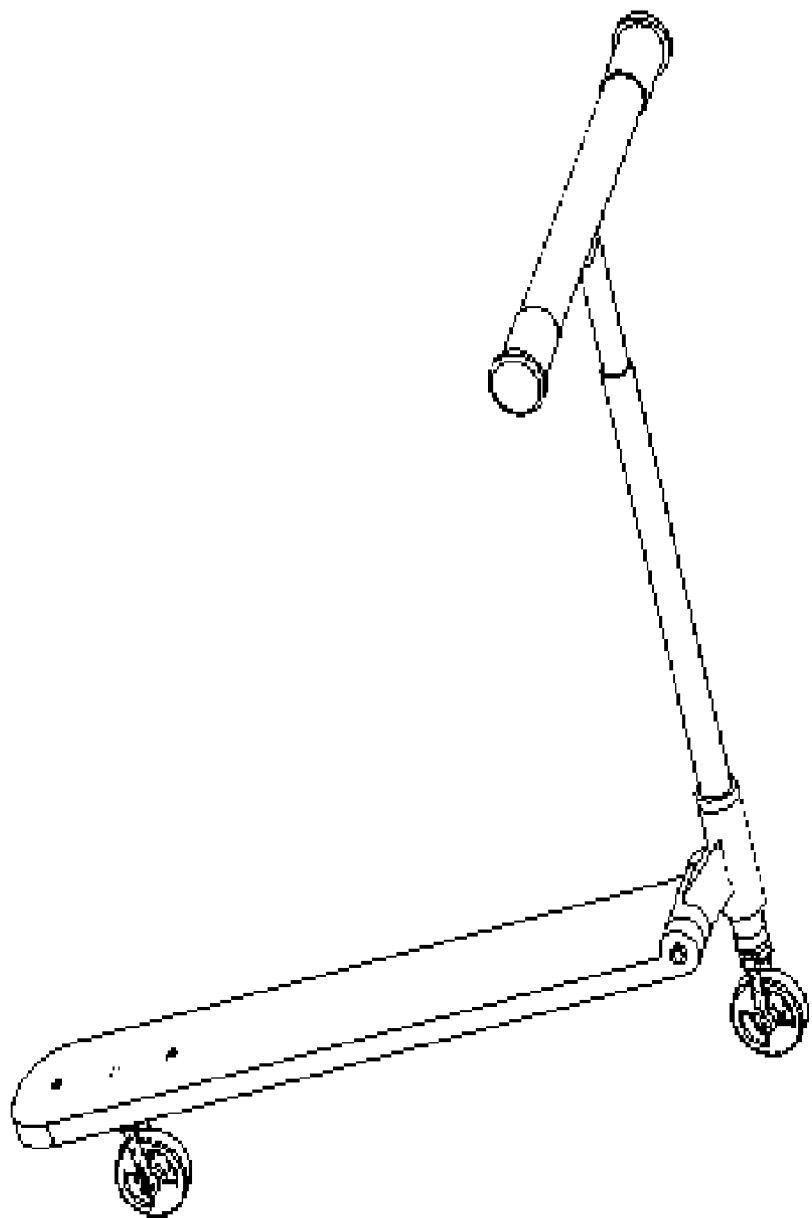
FIG. 25 shows the display of a twenty-part scooter assembly.

The sixth example illustrates a scooter assembly containing 20 parts, as shown in FIG. 25. The purpose of this example is to provide specific measurements of the benefits of an embodiment of the present invention on a non-trivial assembly relative to the prior art.

Figure 26:
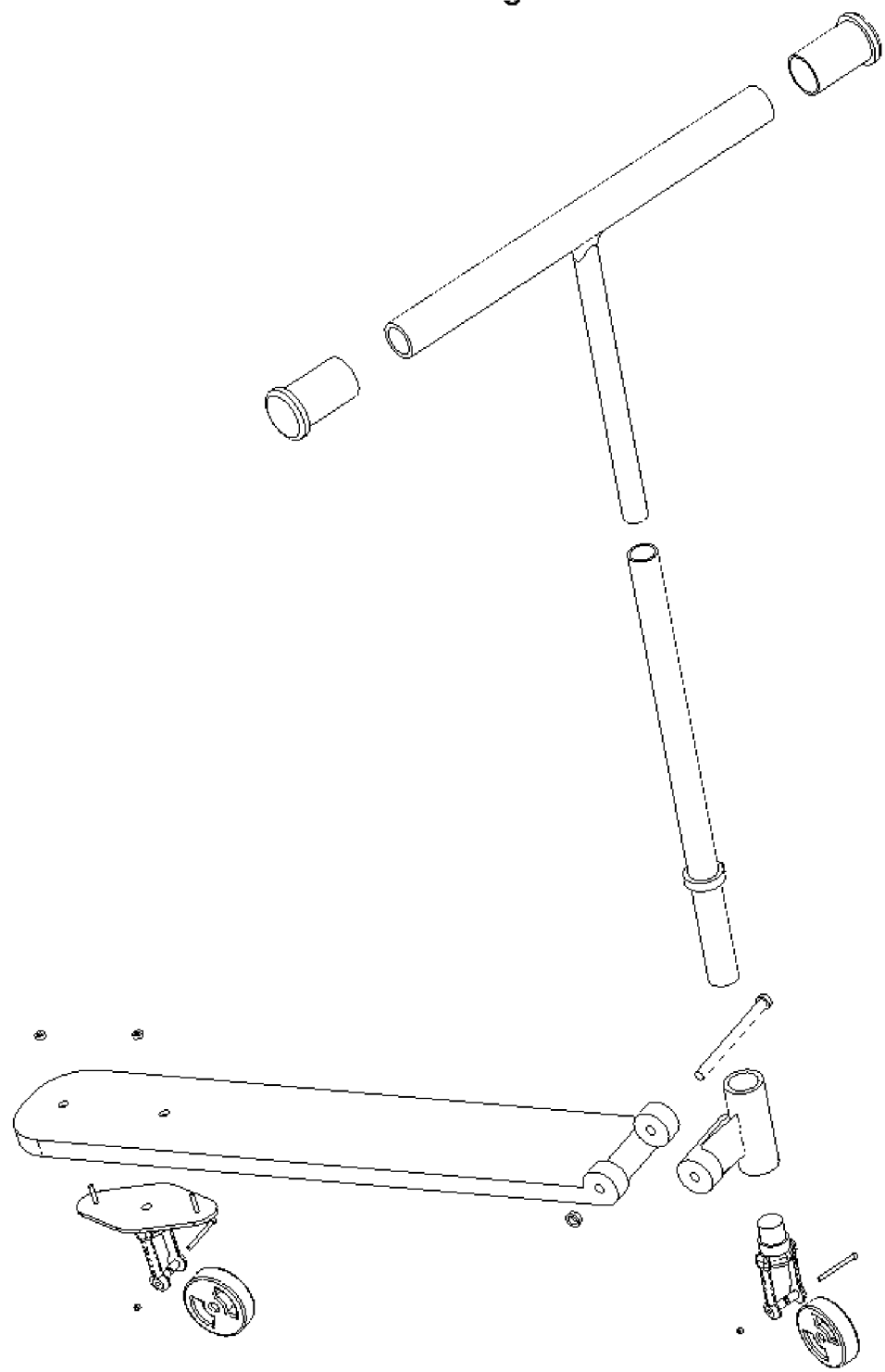
FIG. 26 shows the display of an exploded view of the twenty-part scooter assembly.
Figure 27:
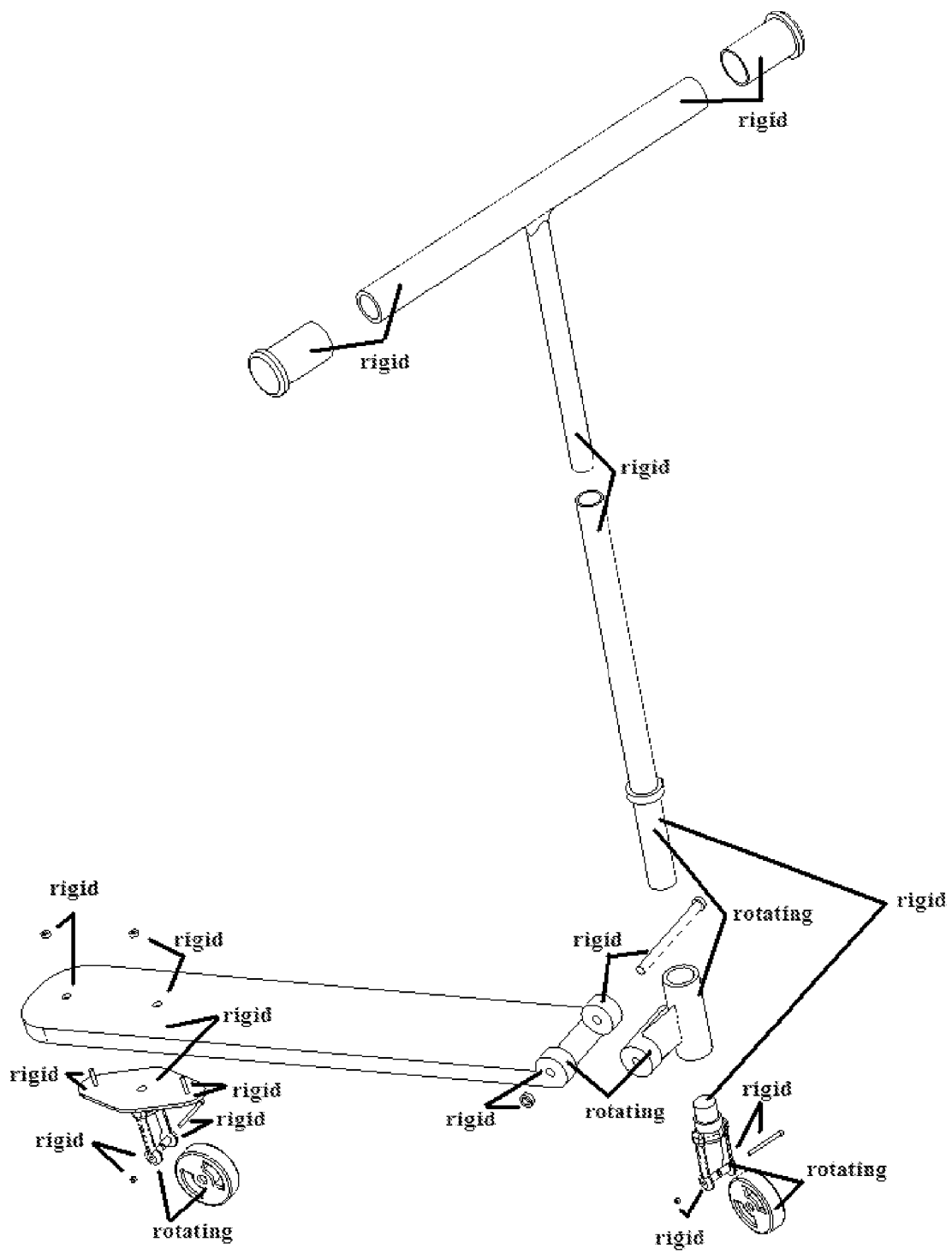
FIG. 27 shows the display of the connections of the twenty-part scooter assembly, according to one embodiment of the present invention.
Figure 28:
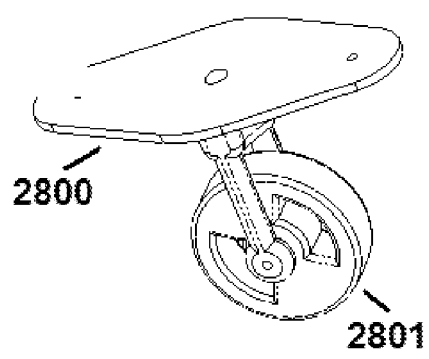
FIG. 28 shows a display of the first rotating connection of the scooter assembly, according to one embodiment of the present invention.
Figure 29:
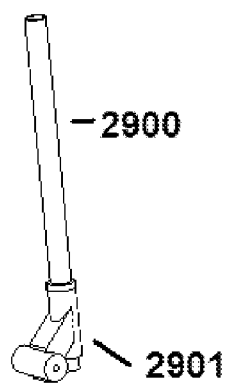
FIG. 29 shows a display of the second rotating connection of the scooter assembly, according to one embodiment of the present invention.
Figure 30:
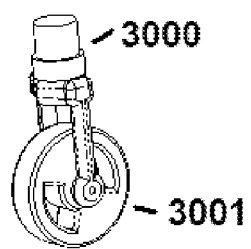
FIG. 30 shows a display of the third rotating connection of the scooter assembly, according to one embodiment of the present invention.
Figure 31A:
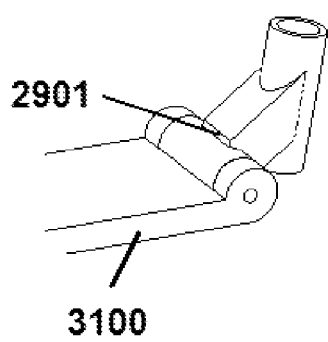
FIG. 31A shows a display of the fourth rotating connection of the scooter assembly in its starting position, according to one embodiment of the present invention.
Figure 31B:
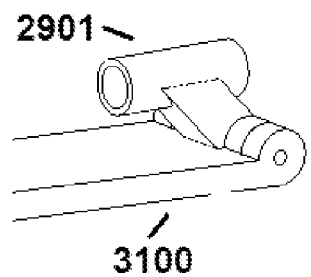
FIG. 31B shows a display of the fourth rotating connection of the scooter assembly in its final position, according to one embodiment of the present invention.
Figure 33:
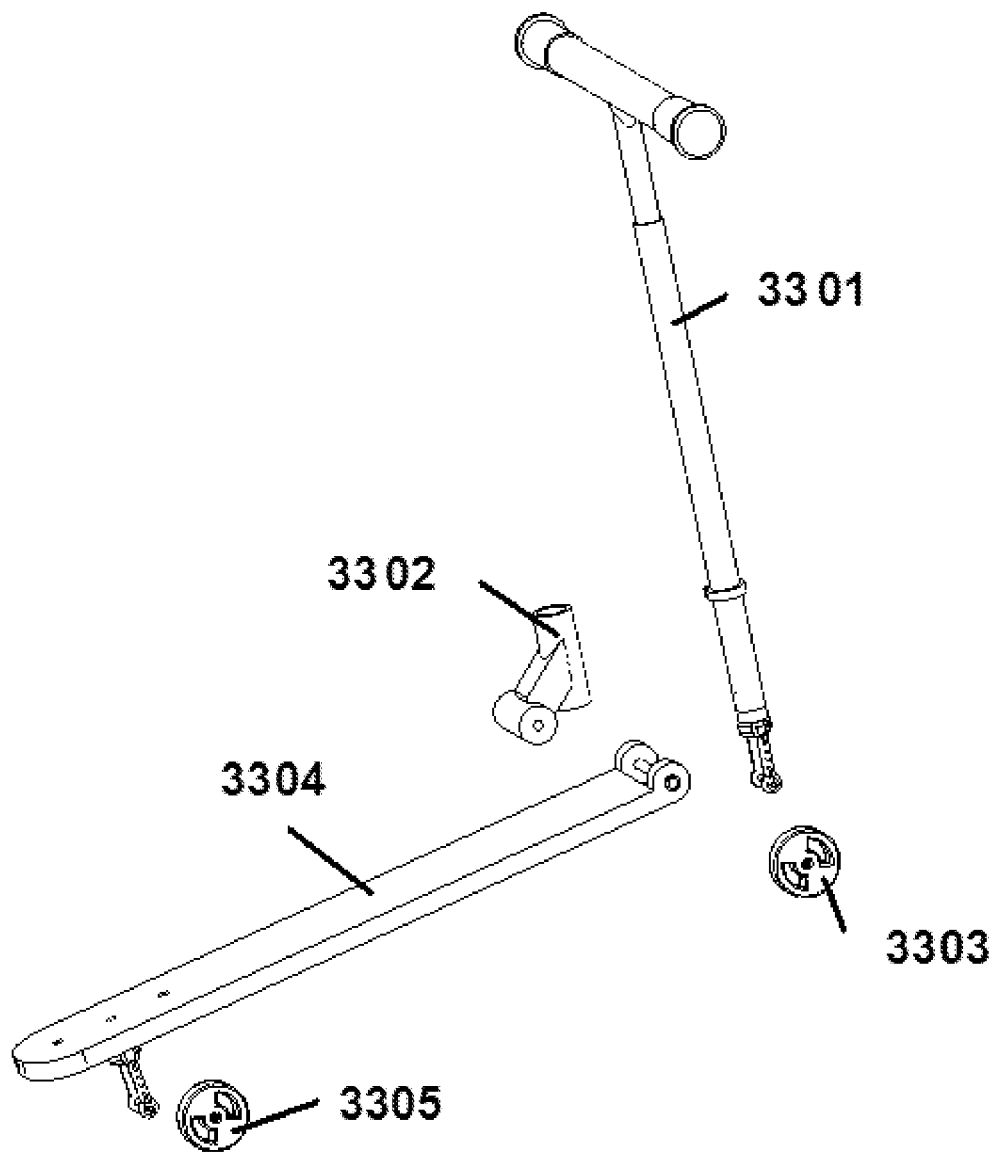
FIG. 33 shows the five rigid subsets of the scooter assembly, as determined by one embodiment of the present invention.

FIG. 26 shows an exploded view of the assembly. The assembly consists of all rigid or rotating connections as shown in FIG. 27. It can be visually verified that each connection shown can be created using an embodiment of the invention as described in the previous examples, as each connection is either a rigid or rotating connection based on connections sides defined from a hole on a planar face. Because the detailed descriptions of creating rigid and rotating connections were given in the examples above, it will not be repeated here. FIGS. 28 through 31B show the four rotating connections and any limits if they have them. In FIG. 28, Rotating Connection1 allows rear wheel 2801 is able to rotate infinitely relative to rear wheel bracket 2800. In FIG. 29, Rotating Connection2 allows column 2900 to rotate infinitely relative to main bracket 2901. In FIG. 30, Rotating Connection 3 allows rear wheel 3001 to rotate infinitely relative to rear wheel bracket 3000. RotatingConnection4 is a limited rotating connection between main bracket 2901 and platform 3100, as shown in FIG. 31A in its Open Position, and FIG. 31B in its Closed Position. RotatingConnection4 is limited to move only between these two positions. FIG. 32 shows a list of the mates required in the prior art versus a list of the connections required in an embodiment of the invention. Note that the number of connections is less than half the number of mates and is thus easier for the user to manage. Also, note that each connection fully describes the nature of the attachment between the parts (rigid or rotating), while the nature of each attachment is difficult to discern from the mates. The algorithm Assembly.GetRigidSubsetsOfParts( ) described in pseudo-code below is used to determine that the scooter assembly of twenty parts actually consists of the five rigid subsets. The five rigid subsets are graphically displayed in FIG. 33. Subset 3301 has seven parts; subset 3302 has one part; subset 3303 has one part, subset 3304 has ten parts; and subset 3305 has one part.

```
// Copyright, LCDesign, Inc. 2008
// a rigid subset is just a list of parts
Class RigidSubset
{
    List<Part> parts;
}
// this routine returns a list of all the rigid subsets in the assembly.
List<RigidSubset> Assembly.GetRigidSubsetsOfParts( )
{
    // create an empty list of rigid subsets
    List<RigidSubset> rigidSubSetList = new List<RigidSubset>(0);
    // for each part in the assembly
    Foreach (part in Assembly.parts)
    {
        / / if the part has not been marked yet, create a new rigid subset,
        // add the part to the subset list, and then process the part
        If (part.marked is false)
        {
            RigidSubset newSubset = new RigidSubset;
            RigidSubsetList.Add(newSubset);
            MarkRigidlyConnectedParts(part,newSubset);
        }
    }
    // clear all the marks from the parts and connections
    // foreach part in the assembly, unmark it (for next time)
    foreach(part in this.parts)
    {
        Part.isMarked = false;
        // foreach connection to the part, unmark it
        Foreach (connection in Part.connections)
            Connection.isMarked = false;
    }
    // return the list of rigid subsets
    return rigidSubSetList;
}
// this routine takes in an unprocessed part and a rigid subset
// it adds the part to the rigid subset, and then, for each rigid connection
```

```
// with an unprocessed part at the other end, recursively calls itself
// this results in all parts rigidly connected to this part being put in the
// input subset MarkRigidlyConnectedParts(Part partIn, RigidSubset
subsetIn)
{
    // mark the part as processed
    partIn.marked = true;
    // add it to the subset
    subsetIn.Add(partIn);
    // foreach connection to the part
    foreach (connection in partIn.connections)
    {
        // if the connection is rigid and unprocesseds
        If (connection.IsRigid is true and connection.isMarked is false)
        {
            // mark the connection as processed
            Connection.isMarked = true;
            // get the part at the other end of the connection and process it
            Part otherPart = connection.GetOtherPart(partIn);
            MarkRigidlyConnectedParts(otherPart, partListIn);
        }
    }
}
// Given one part, this Connection routine returns other part in the
connection Part Connection.GetOtherPart(partIn)
{
    Part part1 = this.side1.owningPart;
    Part part2 = this.side2.owningPart;
    if (part1 is partIn)
        Return part2;
    else if (part2 is partIn)
        Return part1;
    else
        Return null;
}
```

Figure 34:
FIG. 34 shows the required input in the prior art to a typical constraint solver to solve the movement of the scooter assembly.
Figure 35:
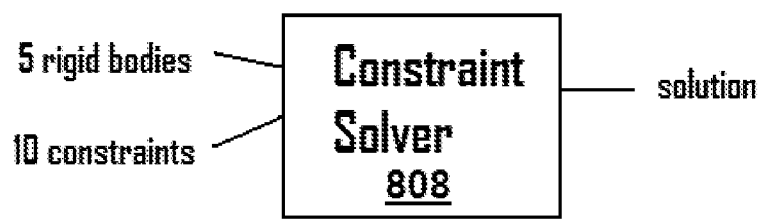
FIG. 35 shows the input required by one embodiment of the present invention to a typical constraint solver to solve the movement of the scooter assembly.

FIG. 34 shows the required input to a typical constraint solver 808 of the prior art to solve the movement of the scooter assembly in the mate based assembling process of the prior art. FIG. 35 shows the required input to the same typical constraint solver 808 of the prior art to solve the movement of the assembly in the connection based assembling process of an embodiment of the present invention. In the prior art, the rigid subsets were not known a priori, so all twenty parts must be passed as rigid subsets, and all forty-four constraints defined by the forty-four mates must be passed as constraints. In the embodiment of the invention, only the five rigid subsets need to be passed and only the four constraints related to the four rotating connections need to be passed. In each rotating connection, there are two constraints implied (a plane to plane constraint and an axis to axis constraint), so for the five rotating connections there are ten constraints passed. Note that over four times as much data is required in the prior art. Also, note that in the prior art, there will be fourteen extraneous and incorrect rotating degrees of freedom (one for each bolt and one for each nut in the assembly) in the total assembly due to the sixth deficiency described earlier.

Finally, it is possible for a system employing an embodiment of the present invention to require that for any two components that are connected by a Moving Connection, a single position is defined that represents that Moving Connection's Preferred Position, or its preferred orientation. A Rigid Connection only has only one orientation, which can implicitly be considered its Preferred Position. If all Components in an assembly have a Preferred Position, then the entire assembly can be reset to a single Preferred Position for the entire assembly at any time.

Alternate Embodiments

The order in which the steps of the present method are performed is purely illustrative in nature. In fact, the steps can be performed in any order or in parallel, unless otherwise indicated by the present disclosure.

The method of the present invention may be performed in either hardware, software, or any combination thereof, as those terms are currently known in the art. In particular, the present method may be carried out by software, firmware, microcode, or the like (or any combination thereof) operating on a computer or computers of any type, without limitation to a "CAD computer." Additionally, software embodying the present invention may comprise computer instructions in any form (e.g., source code, object code, and/or interpreted code, etc.) stored in any computer-readable medium (e.g., ROM, RAM, magnetic media, punched tape or card, compact disc (CD), and/or digital versatile disc (DVD), etc.). Furthermore, such software may also be in the form of a computer data signal embodied in a carrier wave, such as that found within the well-known Web pages transferred among devices connected to and with computer networks, such as the Internet. Accordingly, the present invention is not limited to any particular platform.

While the invention has been disclosed in connection with a technical description of how to reduce the invention to practice, various modifications and improvements will become readily apparent to those skilled in the art. Accordingly, the spirit and scope of the present invention is to be limited only by the following claims.

We claim:

1. A method comprising:
    identifying, using a computing device, an assembly comprising a plurality of parts, wherein each of the parts is associated with a respective shape definition and a respective orientation in the assembly, wherein the assembly includes a first set of parts and a second different set of parts and wherein the second set of parts includes parts that are connected to either each other or another part in the first set of parts by a rigid connection;
    receiving user input connecting each of a plurality of different pairs of the parts from the first set of parts using a respective moveable connection wherein the respective connection specifies a rotating or a sliding connection between the respective parts of the pair based on the respective orientations of the respective parts, and wherein the connection specifies one or two respective degrees of freedom of movement of the respective parts relative to each other, wherein each respective degree of freedom is associated with a set of valid positions for the respective parts for the respective degree of freedom;
    for one or more parts in the second set of parts that are connected directly or indirectly by a rigid connection to a respective part of the first set of parts, identifying rigid connections along a respective part such that the respective part and the other parts cannot move relative to each other based on sets of valid positions for the respective part and the other parts, wherein the respective part and the other parts form a rigid body subset of one or more rigid body subsets;
    resolving constraints for the assembly including resolving constraints for one or more parts having moveable connections and not resolving constraints for one or more parts having rigid connections, wherein resolving constraints comprises identifying a set of new orientations that conform to the constraints;
    and displaying at least one of the new orientations that conform to the constraints.

2. The method of claim 1, further comprising:
receiving user input connecting each of one or more additional pairs of the parts using a respective connection that specifies a rigid connection between the respective parts of the pair based on the respective orientations of the respective parts in the assembly such that the respective parts cannot move relative to each other; and
wherein one of the rigid body subsets contains at least one of the additional pairs of parts.

3. The method of claim 1 wherein a first pair of the plurality of pairs specifies a sliding connection, wherein the sliding connection has a respective degree a freedom that is associated with a set of valid positions for linear movement of the respective parts of the first pair relative to each other along the respective degree of freedom.

4. The method of claim 1 wherein a first pair of the plurality of pairs specifies a rotating connection, wherein the rotating connection has a respective degree of freedom that is associated with a set of valid positions for rotational movement of the respective parts of the first pair relative to each about the respective degree of freedom.

5. The method of claim 1 wherein each part in each rigid body subset of the parts is connected to a second part in the subset by a respective rigid connection such that the part and the second part cannot move relative to each other.

6. The method of claim 1, further comprising:
identifying a plurality of constraints specified by the respective moveable connections without the use of a constraint solver;
providing the identified constraints and the rigid body subsets to a constraint solver; and
receiving from the constraint solver new positions for one or more of the parts in the assembly.

7. The method of claim 1 wherein the respective parts of each pair of parts are connected to each other without the use of a mate.

8. A system comprising:
one or more computers programmed to perform operations comprising:
identifying an assembly comprising a plurality of parts, wherein each of the parts is associated with a respective shape definition and a respective orientation in the assembly, wherein the assembly includes a first set of parts and a second different set of parts and wherein the second set of parts includes parts that are connected to either each other or another part in the first set of parts by a rigid connection;
receiving user input connecting each of a plurality of different pairs of the parts from the first set of parts using a respective moveable connection wherein the respective connection specifies a rotating or a sliding connection between the respective parts of the pair based on the respective orientations of the respective parts, and wherein the connection specifies one or two respective degrees of freedom of movement of the respective parts relative to each other, wherein each respective degree of freedom is associated a set of valid positions for the respective parts for the respective degree of freedom;
for one or more of the plurality of parts in the second set of parts that are connected directly or indirectly by a rigid connection to a respective part of the one or more parts in the first set of parts, identifying rigid connections along a respective part such that the respective part and the other parts cannot move relative to each other based on a sets of valid positions for the respective part and the other parts, wherein the respective part and the other parts form a rigid body subset of one or more rigid body subsets; and
resolving constraints for the assembly including resolving constraints for one or more parts having moveable connections and not resolving constraints for one or more parts having rigid connections, wherein resolving constraints comprises identifying a set of new orientations that conform to the constraints;
and displaying at least one of the new orientations that conform to the constraints.

9. The system of claim 8, further comprising:
receiving user input connecting each of a one or more additional pairs of the parts using a respective connection that specifies a rigid connection between the respective parts of the pair based on the respective orientations of the respective parts in the assembly such that the respective parts cannot move relative to each other; and
wherein one of the rigid body subsets contains at least one of the additional pairs of parts.

10. The system of claim 8 wherein a first pair of the plurality of pairs specifies a sliding connection, wherein the sliding connection has a respective degree a freedom that is associated with a set of valid positions for linear movement of the respective parts of the first pair relative to each other along the respective degree of freedom.

11. The system of claim 8 wherein a first pair of the plurality of pairs specifies a rotating connection, wherein the rotating connection has a respective degree of freedom that is associated with a set of valid positions for rotational movement of the respective parts of the first pair relative to each about the respective degree of freedom.

12. The system of claim 8 wherein each part in each rigid body subset of the parts is connected to a second part in the subset by a respective rigid connection such that the part and the second part cannot move relative to each other.

13. The system of claim 8, further comprising:
identifying a plurality of constraints specified by the respective connections without the use of a constraint solver;
providing the identified constraints and the rigid body subsets to a constraint solver; and
receiving from the constraint solver new respective orientations for one or more of the parts in the assembly.

14. The system of claim 8 wherein the respective parts of each pair of parts are connected to each other without the use of a mate.

15. A method comprising:
identifying, using one or more computer processors, a plurality of parts, wherein each of the parts is associated with a respective shape definition and a respective orientation, wherein the plurality of parts includes a first set of parts and a second different set of parts and wherein the second set of parts includes parts that are connected to either each other or another part in the first set of parts by a rigid connection;
receiving user input connecting a pair of parts from the first set of parts using a respective moveable connection wherein the respective connection specifies a rotating or a sliding connection between respective parts of the pair based on the respective orientations of the respective parts, and wherein the connection specifies one or two respective degrees of freedom of movement of the respective parts relative to each other, wherein each respective degree of freedom is associated with a set of valid positions for the respective parts for the respective degree of freedom;

for one or more parts in the second set of parts that are connected directly or indirectly by a rigid connection to a respective part of the first set of parts, identifying rigid connections along a respective part such that the respective part and the other parts cannot move relative to each other based on sets of valid positions for the respective part and the other parts, wherein the respective part and the other parts form a rigid body subset of one or more rigid body subsets;

resolving constraints for the plurality of parts including resolving constraints for the pair of parts having a moveable connection and not resolving constraints for the one or more parts in the second set of parts that are connected directly or indirectly by a rigid connection, wherein resolving constraints comprises identifying a set of new orientations that conform to the constraints;

and displaying at least one of the new orientations that conform to the constraints.

* * * * *